United States Patent
Gomyo et al.

(10) Patent No.: US 7,455,457 B2
(45) Date of Patent: Nov. 25, 2008

(54) HYDRODYNAMIC BEARING DEVICE AND A RECORDING DISK DRIVE EQUIPPED WITH IT

(75) Inventors: Masato Gomyo, Nagano (JP); Masayoshi Saichi, Nagano (JP); Shingo Suginobu, Nagano (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 11/712,610

(22) Filed: Feb. 27, 2007

(65) Prior Publication Data

US 2007/0154123 A1 Jul. 5, 2007

Related U.S. Application Data

(63) Continuation of application No. 10/872,976, filed on Jun. 18, 2004, now Pat. No. 7,201,517.

(30) Foreign Application Priority Data

| Jun. 23, 2003 | (JP) | 2003-178368 |
| Jul. 30, 2003 | (JP) | 2003-282497 |
| Sep. 30, 2003 | (JP) | 2003-340952 |

(51) Int. Cl.
F16C 32/06 (2006.01)

(52) U.S. Cl. .................................... 384/110

(58) Field of Classification Search ................ 384/100, 384/107, 115–119
See application file for complete search history.

(56) References Cited

U.S. PATENT DOCUMENTS

| 6,364,532 | B1 * | 4/2002 | Yoshikawa et al. .......... 384/107 |
| 6,664,686 | B2 | 12/2003 | Ichiyama |
| 6,664,687 | B2 | 12/2003 | Ichiyama |
| 6,674,200 | B2 | 1/2004 | Tokunaga |
| 6,686,674 | B2 | 2/2004 | Ichiyama |
| 6,836,388 | B2 | 12/2004 | Nishimura et al. |
| 6,888,278 | B2 | 5/2005 | Nishimura et al. |

(Continued)

FOREIGN PATENT DOCUMENTS

JP 07-007886 1/1995

(Continued)

*Primary Examiner*—Thomas R Hannon
(74) *Attorney, Agent, or Firm*—Reed Smith LLP

(57) ABSTRACT

A hydrodynamic bearing device comprises a shaft bush having a substantially conical inclined dynamic pressure surface around the outer circumference thereof which is relatively rotatably inserted in a bearing sleeve having a substantially conical inclined dynamic pressure surface around the inner circumference thereof. A substantially conical inclined bearing space is created in the gap between the inclined dynamic pressure surfaces of the bearing sleeve and shaft bush. Lubricant fluid is filled inside the inclined bearing space. A proper dynamic pressure generating means is formed on at least one of the inclined dynamic pressure surfaces of the shaft bush and bearing sleeve. The lubricant fluid is pressurized by the dynamic pressure generating means to generate dynamic pressure, by which the shaft bush and the bearing sleeve are relatively elevated in the radial and thrust directions so that their rotations are supported in a non-contact manner. A fluid sealing portion is provided in the inclined bearing space to prevent the lubricant fluid from leaking outside of the inclined bearing space. A fluid pressurizing means is provided between the inclined bearing space and the fluid sealing portion to pressurize the lubricant fluid in the direction to push it toward the inside of the inclined bearing space.

5 Claims, 23 Drawing Sheets

U.S. PATENT DOCUMENTS 6,914,358 B2    7/2005    Tokunaga et al.
6,939,047 B2    9/2005    Gomyo et al.

FOREIGN PATENT DOCUMENTS

| JP | 10-339318 | 12/1998 |
| JP | 2002-005171 | 1/2002 |
| JP | 2002-174226 | 6/2002 |
| JP | 2003-097547 | 4/2003 |

\* cited by examiner

Prior Art

Prior Art

HYDRODYNAMIC BEARING DEVICE AND A RECORDING DISK DRIVE EQUIPPED WITH IT

CROSS-REFERENCE TO RELATED APPLICATIONS

This is a continuation of U.S. application Ser. No. 10/872, 976, filed Jun. 18, 2004 now U.S. Pat. No. 7,201,517, which claims priority to Japanese Patent Application No. 2003-178368, filed Jun. 23, 2003, No. 2003-282497, filed Jul. 30, 2003, and No. 2003-340952 filed Sep. 30, 2003, the complete disclosures of which are hereby incorporated by reference.

BACKGROUND OF THE INVENTION a) Field of the Invention

The present invention relates to a hydrodynamic bearing device in which a substantially conically-shaped shaft bush and a bearing sleeve are relatively elevated by dynamic pressure of lubricant fluid so that their rotations are supported in a non-contact manner, and to a recording disk drive equipped with it.

Also, the present invention relates to a hydrodynamic bearing device having a hydrodynamic bearing member that supports a rotary shaft with dynamic pressure of lubricant fluid, and to a disk driving device.

b) Description of the Related Art

In recent years, hydrodynamic bearing devices in which various bodies-to-be-rotated can be supported at a high speed rotation in a stable manner have been developed. In such bearing devices a conical hydrodynamic bearing device, wherein a shaft bush having a substantially conical inclined dynamic pressure surface is relatively rotatably inserted into a shaft sleeve having a conical inclined dynamic pressure surface, and the lubricant fluid such as oil is filled in a substantially conical inclined bearing space which is created in the gap between the inclined dynamic pressure surface of the bearing sleeve and the inclined dynamic pressure surface of the shaft bush.

Then, a dynamic pressure generating means composed of properly-shaped recessed grooves is cut on at least one of the inclined dynamic pressure surfaces of the shaft bush and bearing sleeve. When the shaft bush and the bearing sleeve are relatively rotated, the lubricant fluid is pressurized by the dynamic pressure generating means to generate dynamic pressure. Using the dynamic pressure of the lubricant fluid, the shaft bush and the bearing sleeve are relatively elevated in both the radial and thrust directions so that both members are rotatably supported in a non-contact manner. For example, Patent References 1 through 4 are known:

| | |
|---|---|
| Patent Reference 1: | JP H7-7886 Publication |
| Patent Reference 2: | JP H10-339318 Publication |
| Patent Reference 3: | JP 2002-174226 Publication |
| Patent Reference 4: | JP 2003-97547 |

As mentioned above, in a conical hydrodynamic bearing device, the dynamic pressure surfaces formed on the bearing sleeve and shaft bush are substantially conically inclined with respect to the rotary shaft; in order to obtain a stable amount of relative float between the fixed member and the rotary member, it is desirable to make the open angles of the inclined dynamic pressure surfaces (i.e. the angle corresponding to the vertex angle of the conically-shaped inclined hydrodynamic pressure surface) as great as possible so that the dynamic pressure in the thrust direction is increased.

In recent years, as a bearing device for rotating bodies-to-be-rotated at a high speed and with high precision among various rotation drive devices, a hydrodynamic bearing device in which dynamic pressure is generated in lubricant fluid to support a rotary shaft in a non-contact manner has been developed. In such a hydrodynamic bearing device, the present inventors have proposed a hydrodynamic bearing device in which a thrust hydrodynamic bearing portion, SB, is configured as in FIG. 23, in order to manufacture a thin device on the whole. In other words, in the thrust hydrodynamic bearing portion SB shown in the figure, a rotary member (rotary hub) 303 is joined to a rotary shaft 302 that is rotatably supported by a hydrodynamic bearing portion (bearing sleeve) 301; the end surface of the rotary member 303 on the axially inner side (the bottom surface in FIG. 23) in the center area and the end surface of the hydrodynamic bearing member 301 on the axially outer side (the top end surface in FIG. 23) are closely opposed to each other and the above-mentioned thrust hydrodynamic bearing portion SB is formed in a portion of the area created between the opposing members in the thrust direction.

Inside of the bearing space at the thrust hydrodynamic bearing portion SB, suitable lubricant fluid (not illustrated) is injected; as a dynamic pressure generating means for the lubricant fluid, spiral-shaped dynamic pressure generating grooves are cut along the circumference. By the pressurizing function of the dynamic pressure generating grooves, dynamic pressure is generated in the lubricant fluid to obtain a desirable elevating force in the thrust direction.

Also, two radial hydrodynamic bearing portions RB, RB are provided in the axial direction in the area between the inner circumferential wall surface of the hydrodynamic bearing member 301 and the outer circumferential wall surface of the rotary shaft, which are opposed to each other in the radial direction. Inside of the bearing space of each radial hydrodynamic bearing portion RB, the lubricant fluid (not illustrated) is injected continuously from the above-mentioned thrust hydrodynamic bearing portion SB. As a dynamic pressure generating means for the lubricant fluid, herringbone-shaped dynamic pressure generating grooves are cut along the circumference. By the pressurizing function of the dynamic pressure generating grooves, dynamic pressure is generated in the lubricant fluid to obtain a desirable elevating force in the radial direction.

In the above-mentioned hydrodynamic bearing device, the bearing space is continuous from the two radial hydrodynamic bearing portions RB, RB to the thrust hydrodynamic bearing portion SB, and the lubricant fluid is filled inside the continuous bearing space without interruption.

Problems to be Solved

However, if the open angle of the inclined dynamic pressure surface is set to be large (to support the body-to-be-rotated at a high speed in a stable manner), the entire device becomes large in the radial direction. Even if one attempts to make the device small using this configuration, this configuration cannot be adopted due to the constraints by the magnetic drive portions. Also, if the open angle of the inclined dynamic pressure surface becomes too large, the dynamic pressure in the radial direction becomes low, possibly degrading bearing rigidity.

Further, as the open angle of the inclined dynamic pressure surface is set to be large, the rotational centrifugal force is increased at the outer circumference of the inclined bearing space. Accordingly, the action force by the rotational centrifugal force may become larger than the fluid retaining force of the fluid sealing portion. Thus, even when a fluid sealing portion is provided, the lubricant fluid may leak outside.

Also, in the conical hydrodynamic bearing device, since the inclined bearing space is created between both inclined dynamic pressure surfaces on the bearing sleeve and bearing bush, it is advantageous in that dynamic pressure can be obtained in the radial direction and in the thrust direction simultaneously; on the other hand, however, the pressure balance of the lubricant fluid filled in the inclined bearing space is easily affected by a minute dimensional error in each member, and the differential pressure between both ends of the inclined bearing space becomes great. For this reason, it is difficult to obtain the amount of relative float between the fixed member and rotary member easily and with certainty, and thus it is difficult to obtain a suitable bearing rigidity.

In the hydrodynamic bearing device having such a configuration, the gap dimension of the radial hydrodynamic bearing portion RB and the shape of the dynamic pressure generating groove (the groove length) can be affected by a machining error during manufacturing, bringing an unbalanced shape in the axial direction. Because of this, the different pumping action forces P1, P2 as shown by the lengths of the arrows in FIG. 24 are obtained (P1>P2) in the radial hydrodynamic bearing portion RB at the bottom of the figure, for example. This unbalanced condition in the radial hydrodynamic bearing portion RB cannot be cancelled completely even if the hydrodynamic bearing portions or the neighbors thereof are able to communicate with each other by a circulating hole such as pressure-adjusting bypasses. Especially, if the pressure of the lubricant fluid inside the fluid reservoir 304 provided in the center portion of the bearing space that includes the above-mentioned radial hydrodynamic bearing portion RB and thrust hydrodynamic bearing portions SB becomes a negative pressure, which is smaller than the atmospheric pressure, bubbles may be generated in the lubricant fluid. If such bubbles invade the inside of each hydrodynamic bearing portion, desirable dynamic pressure cannot be obtained and the bearing property is greatly degraded.

OBJECT AND SUMMARY OF THE INVENTION

Therefore, an object of the present invention is to provide a hydrodynamic bearing device in which a good amount of relative float (between the fixed member and rotary member) can be obtained in a stable and certain manner without enlarging the open angle of the inclined dynamic pressure surface and while preventing the lubricant fluid from leaking from the inclined bearing space, and to provide a recording disk drive equipped with such a bearing device.

Also, another objective of the present invention is to provide a hydrodynamic bearing device with a simple configuration in which the differential pressure at both ends of the inclined bearing space can be maintained properly and the proper amount of relative float can be obtained between the fixed member and the rotary member, and to provide a recording disk drive equipped with such a bearing device.

Further, another objective of the present invention is to provide a hydrodynamic bearing device with a simple configuration in which bubble formation is well prevented to obtain a stable dynamic pressure property for a long duration, and to provide a recording disk drive equipped with such a bearing device.

To solve the above-mentioned problems and achieve the objectives, in the hydrodynamic bearing device of the present invention, a fluid sealing portion is provided in the substantially conical inclined bearing space, which is created in the gap between the opposing inclined dynamic pressure surfaces of the bearing sleeve and shaft bush, to prevent the lubricant fluid from leaking outside the inclined bearing space; and a fluid pressurizing means is provided between the inclined bearing space and the fluid sealing portion to pressurize the lubricant fluid in the direction to push it toward the inside of the inclined bearing space.

According to the hydrodynamic bearing device described, the lubricant fluid pressurized by the fluid pressurizing means is pushed from the outer circumference toward the inside of the inclined bearing space. With this, the dynamic pressure can be well generated in the lubricant fluid inside the inclined bearing space despite the open angle of the inclined dynamic pressure surface, and also the lubricant fluid that is about to leak outside from the opening of the inclined bearing space on the outer circumferential side is maintained inside the inclined bearing space in a stable manner by the rotational centrifugal force. Thus, the lubricant fluid retaining mechanism of the fluid sealing portion is well supported by the fluid pressurizing means.

In another form of the hydrodynamic bearing device, the fluid pressurizing means is composed of multiple recessed grooves arranged annularly.

According to this form of the hydrodynamic bearing device having such a configuration, the fluid pressurizing means with a simple configuration and with a good pressurizing function can be formed efficiently.

In another form of the hydrodynamic bearing device, the fluid pressurizing means is provided on at least one of the radially opposing wall surfaces of the bearing sleeve and shaft bush. In the hydrodynamic bearing device of yet another form of the invention, the fluid pressurizing means is provided on at least one of the axially opposing wall surfaces of the bearing sleeve and shaft bush.

According to the hydrodynamic bearing device having such a configuration, the fluid pressurizing means with an excellent pressurizing function can be formed easily using the opposing wall surfaces of the bearing sleeve and shaft bush.

In the hydrodynamic bearing device of a different form of the invention, a circulating hole is provided at the bearing sleeve to guide the lubricant fluid which has leaked to the outside of the inclined bearing space back to the inside of the inclined bearing space, and the opening at one end of the circulating hole is arranged between the inclined bearing space and fluid pressurizing means.

According to the hydrodynamic bearing device having such a configuration, the lubricant fluid can flow smoothly through the circulating hole by the pressurizing action of the fluid pressurizing means.

The recording disk drive of a different form of the invention comprises a spindle motor having the hydrodynamic bearing device referred to above, an information recording disk mounted on a rotor of the spindle motor, and a recording head for recording or reproducing the information with respect to the information recording disk.

According to the recording disk drive having such a configuration, the above-mentioned excellent function can be obtained even in the recording disk drive.

To achieve the objective, in the hydrodynamic bearing device of still a different form of the present invention, a circulating hole is provided to at least either the shaft bush or bearing sleeve which are rotatably coupled to each other, passing through the shaft bush or bearing sleeve in a straight line and having an opening at each end in the hole passing direction, to create a circulation path so that the lubricant fluid that has leaked from the inclined bearing space is moved through the circulating hole to cancel the differential pressure generated between both ends of the inclined bearing space; and at least one of a pair of the openings of the circulating hole is formed with an opening face formed on said shaft bush or bearing sleeve, which extends nearly perpendicularly to the hole passing direction.

According to the hydrodynamic bearing device having such a configuration, the lubricant fluid is moved through the circulation path, including the inclined bearing space and the circulating hole, to cancel the unbalance in the pressure of the lubricant fluid, which is created in the inclined bearing space. With this, the pressure of the lubricant fluid at both ends of the inclined bearing space is balanced, and accordingly the proper amount of relative float between the fixed member and the rotary member can be maintained.

Also, the circulating hole is created by moving a tool from the opening face which is nearly perpendicular to the passing direction of the circulating hole. Therefore, since the tool is not displaced, the circulating hole can be formed precisely. Also, since the load stress is evenly applied to the tool, the tool life can be prolonged.

In the hydrodynamic bearing device of yet a different form of the invention, the circulating hole is provided in the fixed member which is the shaft bush or bearing sleeve. According to the hydrodynamic bearing device having such a configuration, the lubricant fluid can flow smoothly through the circulation path including the circulating hole.

Further, in the hydrodynamic bearing device of still another form of the invention, the circulating hole is formed to extend parallel to the inclined dynamic pressure surface. According to the hydrodynamic bearing device having such a configuration, the member, in which the circulating hole is formed, has extra thickness. Therefore, extra thickness can be eliminated from the member to make the outer diameter (of the member) smaller, thus making the whole device smaller.

In the hydrodynamic bearing device of another form of the invention, the dynamic pressure generating means is composed of properly-shaped dynamic pressure generating recessed grooves at a plurality of locations which are spaced along the inclined dynamic pressure surface, and the circulation path including the circulating hole is created with respect to each of the multiple locations.

According to the hydrodynamic bearing device having such a configuration, the pressure balance of the lubricant fluid can be maintained in each dynamic pressure generating means.

The recording disk drive of the invention comprises a spindle motor having the hydrodynamic bearing device of one form of the invention, an information recording disk mounted on a rotor of the spindle motor, and a recording head for recording or reproducing the information with respect to the information recording disk.

According to the recording disk drive having such a configuration, the above-mentioned excellent effects can be obtained even in the recording disk drive.

To achieve the above objective in the hydrodynamic bearing device of the present invention, a bearing space from one of the two radial hydrodynamic bearing portions axially spaced at a proper distance in the area created between the radially opposing wall surfaces, which is next to the thrust hydrodynamic bearing portion, to the thrust hydrodynamic bearing portion communicates with an axially outside space, which is adjacent to the other radial hydrodynamic bearing portion, through a pressure adjusting bypass created separately from the bearing space; a fluid reservoir, which is configured by the gap created by enlarging the bearing space of the radial hydrodynamic bearing portion in the radial direction, is provided in the bearing space between the two radial hydrodynamic bearing portions; and the pumping power applied to the lubricant fluid in the two radial hydrodynamic bearing portions maintains the lubricant fluid in the fluid reservoir at a positive pressure, which is greater than the atmospheric pressure.

According to the hydrodynamic bearing device of a different form of the invention, the bearing space configuring at least one of the two radial hydrodynamic bearing portions is formed to create a either tapered space or a cylindrical (paralleled) space in which respectively the gap dimension of the bearing space gradually (continuously) increases toward the fluid reservoir or remains the same.

Also, in the hydrodynamic bearing device of still another form of the invention, the dynamic pressure generating means is composed of an annular group of herringbone bent grooves which are substantially in the "<" shape, and the point of the herringbone-shaped bent groove of the hydrodynamic pressure generating means, which is arranged on one of the two radial hydrodynamic bearing portions, is shifted from the axial center of the radial hydrodynamic bearing portion toward the fluid reservoir.

According to the hydrodynamic bearing device of certain forms of the invention having such a configuration, the inside of the fluid reservoir provided in the center portion of the bearing space including the two radial hydrodynamic bearing portions and the thrust hydrodynamic bearing portion is maintained at a positive pressure, which is greater than the atmospheric pressure, by the pumping power to the lubricant fluid in the radial hydrodynamic bearing portions. Therefore, bubble formation in the lubricant fluid is well prevented, obtaining the proper and stable dynamic pressure.

In the hydrodynamic bearing device in one form of the invention, the pumping power applied to the lubricant fluid in the thrust hydrodynamic bearing portion in addition to the two radial hydrodynamic bearing portions maintains the lubricant fluid in the fluid reservoir at a positive pressure, which is greater than the atmospheric pressure.

According to the hydrodynamic bearing device having such a configuration, bubble formation in the lubricant fluid is well prevented to obtain a proper dynamic pressure in a stable manner. Thus, a stable dynamic pressure property can be obtained for a long duration with a simple configuration, improving reliability of the hydrodynamic bearing device.

In the hydrodynamic bearing device in another form of the invention, the bearing space configuring one of the two radial hydrodynamic bearing portions, which is longer in the axial direction, is formed to be a tapered space.

According to the hydrodynamic bearing device having such a configuration, the above-mentioned operation can be performed efficiently by a radial hydrodynamic bearing portion having a larger pumping power.

In the hydrodynamic bearing device of still a different form of the invention, in each herringbone-shaped bent groove as the dynamic pressure generating means provided in each of the two radial hydrodynamic bearing portions, the following formula is satisfied:

$$A+D \geq B+C$$

where A and D are respectively the axial length of the groove positioned axially outside of the point, and B and C are respectively the axial length of the groove positioned axially inside of the point.

According to the hydrodynamic bearing device having such a configuration, the pumping power applied to the lubricant fluid in the two radial hydrodynamic bearing portions functions to push the lubricant fluid back into the inside the lubricant reservoir as a whole. Therefore, the fluid reservoir is maintained at a positive pressure, which is greater than the atmospheric pressure, with certainty.

The disk driving device of the present invention comprises a spindle motor having the hydrodynamic bearing device disclosed, an information recording disk mounted on a rotor of the spindle motor, and a recording head for recording or reproducing the information with respect to the information recording disk.

According to the disk driving device having such a configuration, the above-mentioned function can be obtained even with a recording disk drive.

DESCRIPTION OF THE PREFERRED EMBODIMENTS

First Embodiment

The embodiments of the present invention are described in detail hereinafter. Prior to the descriptions, a hard disk drive (HDD) spindle motor having a conical hydrodynamic bearing device, to which the present invention is applied, is described.

Figure 1:
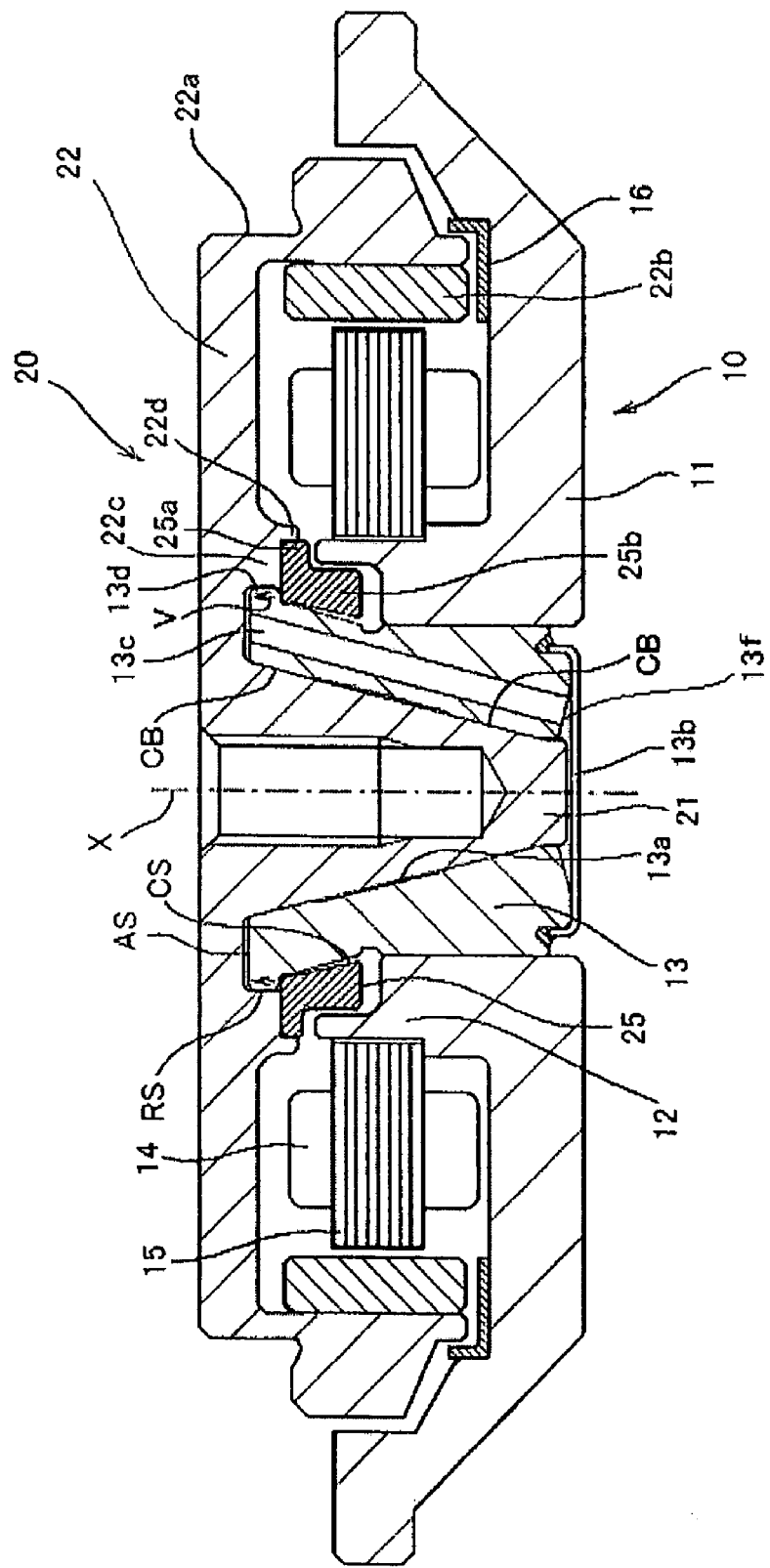
FIG. 1 is a vertical cross section of a rotary-shaft-type HDD spindle motor having a hydrodynamic bearing device of an embodiment of the present invention.

The rotary-shaft/outer rotor-type spindle motor illustrated in FIG. 1 comprises a stator assembly 10, which is a fixed member, and a rotor assembly 20, which is a rotary member coupled to the stator assembly 10 from the top of the figure.

The stator assembly 10 has a base frame 11 to be screwed into the main plate of a hard disk drive (HDD) that is not illustrated. On the inner circumference of the cylindrical sleeve holding portion (bearing member holder) formed about the center portion of the base frame 11, a hollow bearing sleeve 13 is integrally joined with the base frame 11 by a fixing means such as press fit or shrinkage fit. The bearing sleeve 13, composed of a copper material such as phosphor bronze for simplified manufacturing, has a substantially conical bearing center hole 13a that has openings at both ends in the axial direction. Also, a stator core portion 15 in which a stator coil 14 is wound around the salient-pole of a stator core projecting in the radial direction is fitted to the outer circumference of the sleeve holding portion 12.

A shaft bush 21, which is a shaft member configuring a portion of the rotor assembly 20, is inserted in the bearing center hole 13a of the bearing sleeve 13 such that it freely rotates around the central rotation axis X1. The shaft bush 21 of this embodiment is composed of substantially conically-shaped stainless steel to correspond to the shape of the bearing center hole 13a of the bearing sleeve 13. A substantially conical inclined dynamic pressure surface is formed on the inner circumference of the bearing center hole 13a of the bearing sleeve 13, and a substantially conical inclined dynamic pressure surface is also formed on the outer circumference of the shaft bush 21. Note that, about the axial center portion of the inclined dynamic pressure surface on the bearing sleeve 13, an annular depression used as an oil reservoir is formed like a belt.

Also, an inclined bearing space is formed in the small gap between the opposing, inclined dynamic pressure surfaces. In the inclined bearing space, the conical hydrodynamic bearing portions, CB and CB, are created at two places in the axial (dynamic pressure surface) direction, spaced at a proper pitch. More specifically, the inclined dynamic pressure surface on the bearing sleeve 13 and that on the shaft bush 21 in each conical hydrodynamic bearing portion CB are opposed to each other via the inclined bearing space of several μm in which an ester type or poly-α olefin type lubricant oil is filled without interruption.

The opening at the bottom end of the bearing sleeve 13 in the figure is covered and sealed by a cover 13b, by which the lubricant oil inside the conical hydrodynamic bearing portions CB is prevented from leaking outside.

Further, a dynamic pressure generating means having a herringbone-shaped recessed groove structure (not illustrated) is cut in two blocks in the axial direction (along the dynamic pressure surface direction) on at least one of the inclined dynamic pressure surfaces on the bearing sleeve 13 and shaft bush 21. When the shaft bush 21 is rotated, the lubricant oil is pressurized by the pumping action of the dynamic pressure generating grooves to generate dynamic pressure, by which the shaft bush 21 is relatively elevated from the bearing sleeve 13 in the radial direction and in the thrust direction and is maintained in a non-contact manner. Thus, the shaft bush 21 and the rotary hub 22 integrated with or integrally fixed to the shaft bush 21 are rotatably supported.

Note that the lubricant oil pressurized by the dynamic pressure generating grooves in the above manner runs out from the axial end openings of the inclined bearing space including the conical hydrodynamic bearing portions CB. For the lubricant oil running out, a circulating hole 13c is provided passing at an angle through the drum portion of the bearing sleeve 13. Through the circulating hole 13c, the above-mentioned lubricant oil is returned to the conical hydrodynamic bearing portions CB. In other words, the opening of the circulating hole 13c at the bottom end of the figure opens to the space inside of the cover 13b, and the opening at the top end in the figure opens between the top end surface of the bearing sleeve 13, i.e., the inclined bearing space and the fluid pressurizing means 13e which is described later.

The rotary hub 22, which together with the shaft bush 21 configures the rotor assembly 20, is formed in a cup-like shape so that various kinds of information recording media disks such as magnetic disks can be mounted thereon, and is also formed by a member integrated with the shaft bush 21.

The rotary hub 22 has an annular drum portion 22a around the outer circumference thereof to configure a rotor portion; a cylindrical rotor magnet 22b that is magnetized with NS alternately at a predetermined pitch around the circumference is fixed on the inner circumferential surface of the annular drum portion 22a, whereby the rotor portion is configured. The rotor magnet 22b is placed closely to the stator core portion 15 such that it annularly opposes the outer circumference of the stator core portion 15.

The axial bottom end surface of the rotor magnet 22b axially faces a magnetic attraction plate 16 attached to the base frame 11. The entire rotary hub 22 is attracted in the axial direction by the magnetic attraction between the two members 22c and 16, providing a stable rotation.

Figure 2:
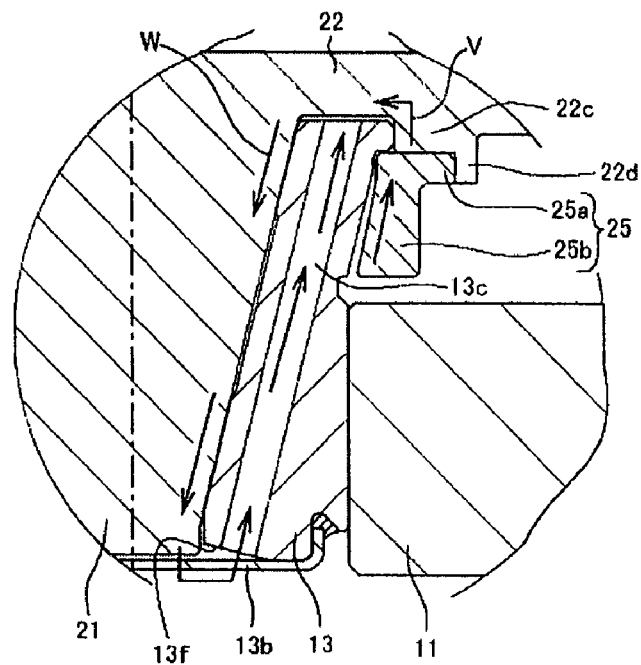
FIG. 2 is a magnified vertical cross section of the structure of a conical hydrodynamic bearing portion used in the HDD spindle motor of FIG. 1.

Especially as illustrated in FIG. 2, the top end surface of the bearing sleeve 13 and the bottom end surface of the rotary hub 22 which extends at the outer circumference of the larger diameter portion of the shaft bush 21 at the root are arranged to closely oppose each other in the axial direction. A gap, AS, is created between the axially opposing top end surface of the bearing sleeve 13 and the bottom end surface of the rotary hub 22, continuing from the top end of the inclined bearing space, i.e., from the opening at the outer circumference, such that the gap AS extends along the radial direction which is nearly orthogonal to the rotation axis X. A gap RS, between the radially opposing wall surfaces, is formed continuously at about right angle from the opening at the outer circumferential end portion of the gap AS to extend downward in the axial direction.

The gap RS created between the radially opposing wall surfaces is formed by closely placing the outer circumferential surface of a stopper engaging flange 13d provided at the outmost circumference of the bearing sleeve 13 at the top end of the figure and the inner circumferential surface of an annular center base portion 22c, which is created by projecting the bottom end surface of the rotary hub 22 at the center portion in the downward direction like a step to cover the stopper engaging flange 13d form the outer circumferential side. And a composite fluid sealing portion, CS, that uses both capillary force and rotational centrifugal force is connected to the opening of the gap RS at the bottom end of the figure to extend downwardly in the figure.

The inner circumferential inclined wall surface and outer circumferential inclined wall surface of the composite fluid sealing portion CS are configured by the outer circumferential surface of the bearing sleeve 13 and the inner circumferential surface of the annular drum portion 25 used as a stopper member which is positioned outside the bearing sleeve 13 to face it in the radial direction. The armular drum member 25 is formed of a ring-like annular member. A plate-like hub mounting portion 25a, configuring the outer circumferential portion of the annular drum member 25, is fixed by a fixing portion 22d provided to the rotary hub 22.

As described above, the stopper engaging flange portion 13d is provided at the top end of the bearing sleeve 13 to project outside in the radial direction, and is arranged such that a portion thereof is axially opposed to the top surface of a main portion 25b of the annular drum member 25. Because those members 13d and 25b are arranged in such a way that they are able to contact each other in the axial direction, the rotary hub 22 is prevented from coming off in the axial direction. In other words, the above-mentioned hub mounting portion 25a of the annular drum member 25 is arranged at the radially outside of the stopper engaging flange portion 13d of the bearing sleeve 13 such that the inner circumferential wall of the hub mounting portion 25a of the annular drum member 25 faces the outer circumferential wall of the stopper engaging flange portion 13d from the radially outside.

Figure 3:
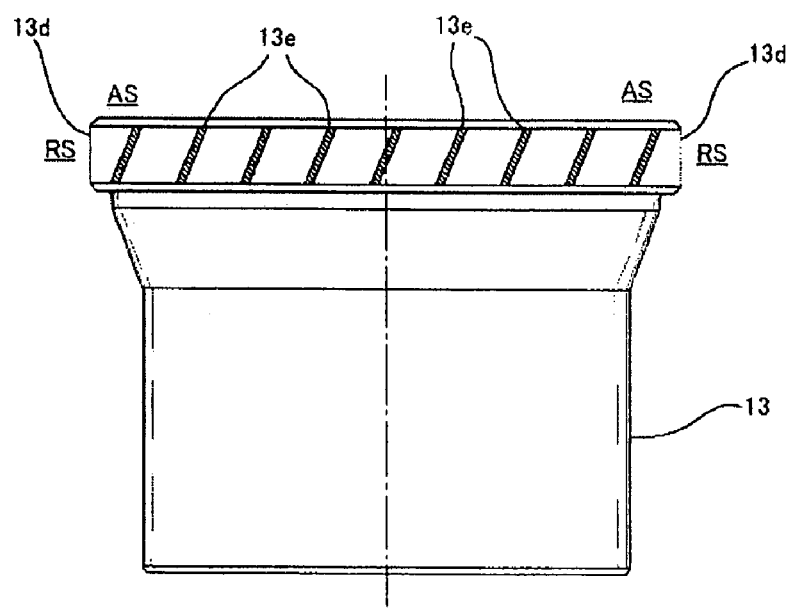
FIG. 3 is a magnified side view of the bearing sleeve of the conical hydrodynamic bearing portion used in the HDD spindle motor of FIG. 1.

As described above, the composite fluid sealing portion CS is formed continuously from the end opening of the inclined bearing space at the outer circumference via the (axially opposing) gap AS and the (radially opposing) gap RS. And the lubricant fluid in the inclined bearing space is filled continuously in the above-mentioned continuous space. Especially as illustrated in FIG. 3, a fluid pressurizing means 13e is formed on the outer circumferential surface of the stopper engaging flange 13d of the bearing sleeve 13, which configures the radially opposing gap RS, for pressurizing the lubricant fluid in the direction to push it toward the inside of the inclined bearing space.

The fluid pressurizing means 13e of this embodiment is composed of multiple spiral-shaped recessed grooves which are arranged annularly and is positioned between the inclined bearing space and the fluid sealing portion CS that prevents the leakage of the lubricant fluid from the inclined bearing space to the outside. The fluid pressurizing means 13e, as shown by the arrow V in FIG. 2, pressurizes the lubricant fluid upwardly in the figure so that the lubricant fluid is pressurized and pumped into the inclined bearing space.

Figure 4:
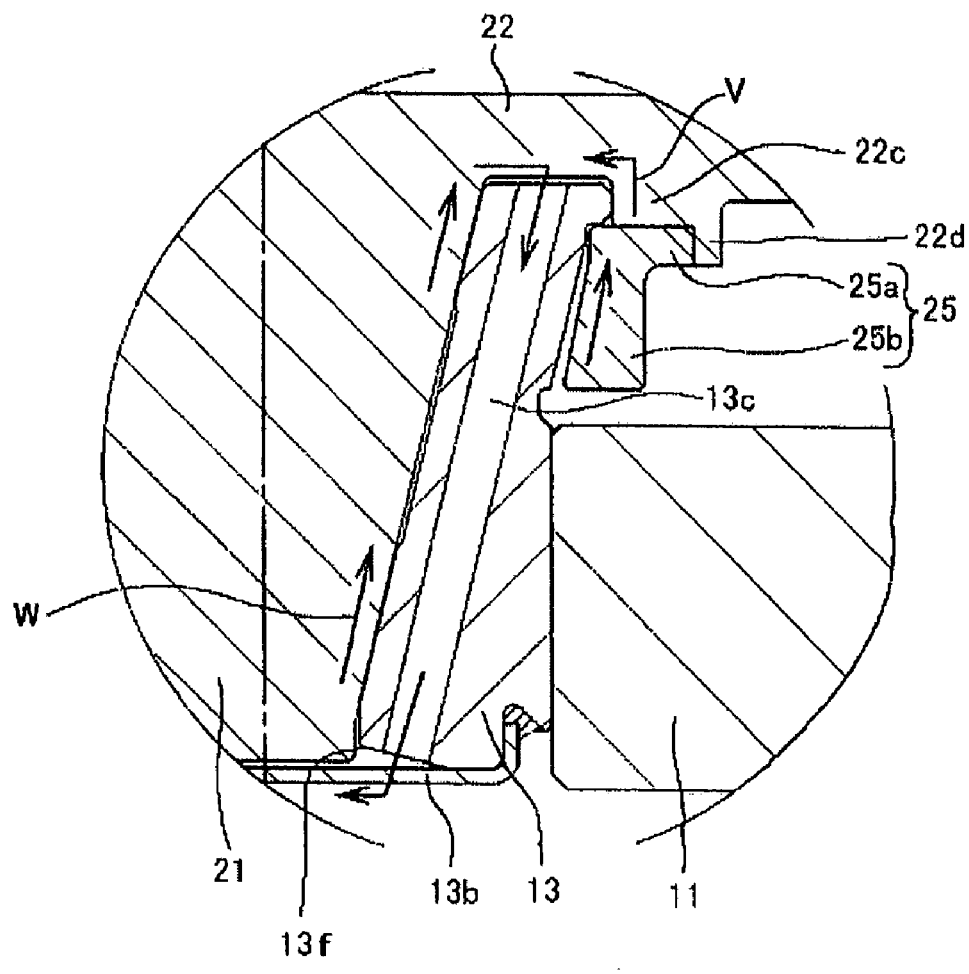
FIG. 4 is a magnified vertical cross section of the other structures of the conical hydrodynamic bearing portion used in the HDD spindle motor of FIG. 1.

At that time, in this embodiment, the flow direction of the lubricant fluid in the inclined bearing space is downward in the figure; however, it can be upward as illustrated in FIG. 4.

As described above, in this embodiment, the lubricant fluid pressurized by the fluid pressurizing means 13e is pushed toward the inside of the inclined bearing space from the outer circumference, by which the dynamic pressure is generated well in the lubricant fluid in the inclined bearing space, despite the open angle of the inclined dynamic pressure surface.

Also, the lubricant fluid that is about to leak to the outside from the opening of the inclined bearing space at the outer circumference is pushed toward the inclined bearing space by the rotational centrifugal force as shown by the arrow W in FIG. 2 and held therein in a stable manner. In other words, since the fluid pressurizing means 13e is positioned between the inclined bearing space and the fluid sealing portion CS in this embodiment, the lubricant fluid retaining mechanism of the fluid sealing portion CS can be well supported by the fluid pressurizing means 13e.

Further, since the fluid pressurizing means 13e in this embodiment is composed of multiple spiral-shaped recessed grooves which are arranged annularly, the fluid pressurizing means 13e having a simple configuration and an excellent pressurizing mechanism can be formed efficiently.

Figure 5:
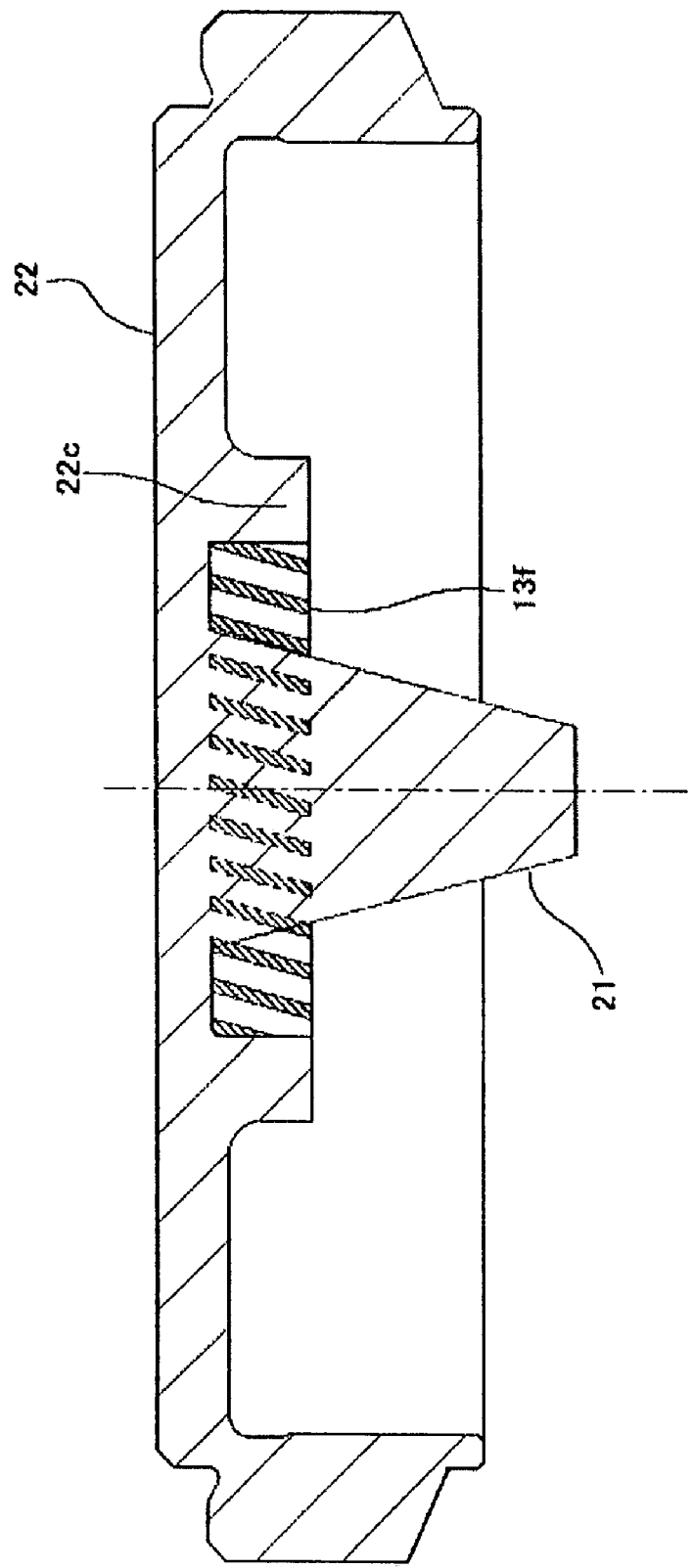
FIG. 5 is a vertical cross section of a rotary member including the shaft bush of a rotary-shaft-type HDD spindle motor which has the hydrodynamic bearing device of another embodiment of the present invention.

In the embodiment shown in FIG. 5, a fluid pressurizing means 13f is provided along the inner circumferential surface of the annular center base portion 22c of the rotary hub 22, which configures the radially opposing gap RS. This fluid pressurizing means 13f is composed of multiple spiral-shaped recessed grooves arranged annularly to pressurize the lubricant fluid in the direction to push it toward the inside of the inclined bearing space. Thus, the lubricant fluid is pressurized upwardly and pumped into the inclined bearing space. Even in this embodiment, the same function/effects as in the above-mentioned embodiment can be obtained.

Figure 6:
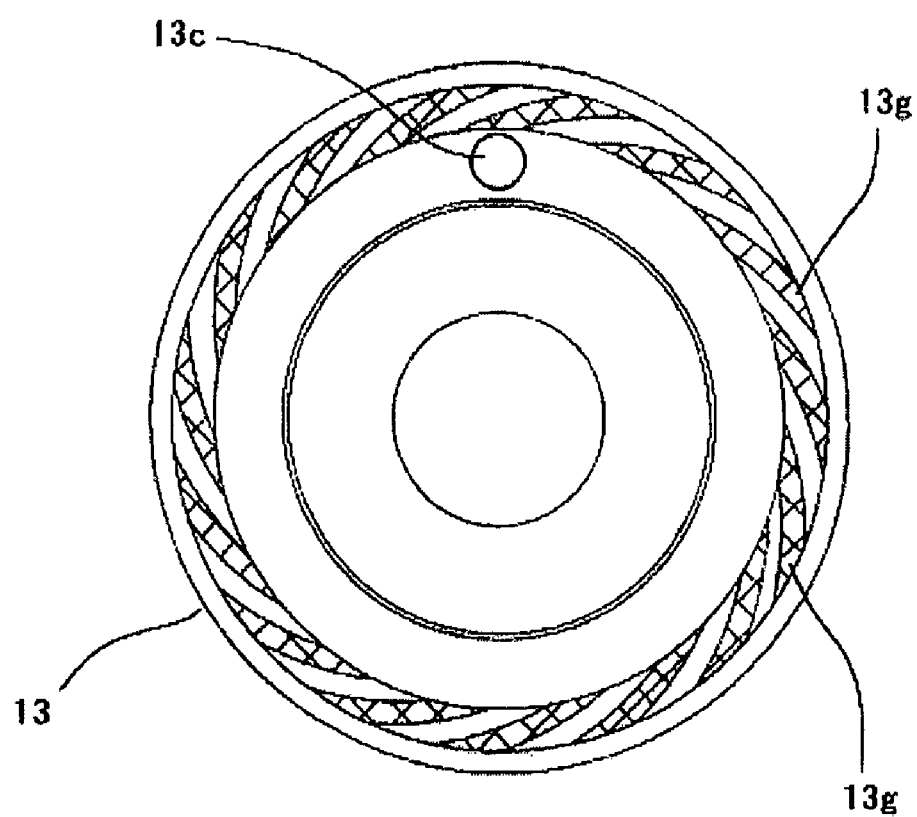
FIG. 6 is a pan view of another embodiment of the bearing sleeve of the conical hydrodynamic bearing portion.

In the embodiment shown in FIG. 6, a fluid pressurizing means 13g is formed at the top end surface of the stopper engaging flange portion 13d of the bearing sleeve 13, i.e., at the end surface on which the axially opposing gap AS is formed, to pressurize the lubricant fluid in the direction to push it toward the inside of the inclined bearing space. The fluid pressurizing means 13g of this embodiment is also composed of multiple spiral-shaped recessed grooves arranged annularly to pressurize the lubricant fluid toward the center and pump the fluid into the inclined bearing space.

Even in this embodiment, the same function/effects as in the above-mentioned embodiments can be obtained. Note that it is possible to provide the fluid pressurizing means 13g on the rotary hub 22 on which the axially opposing gap AS is formed.

Figure 7:
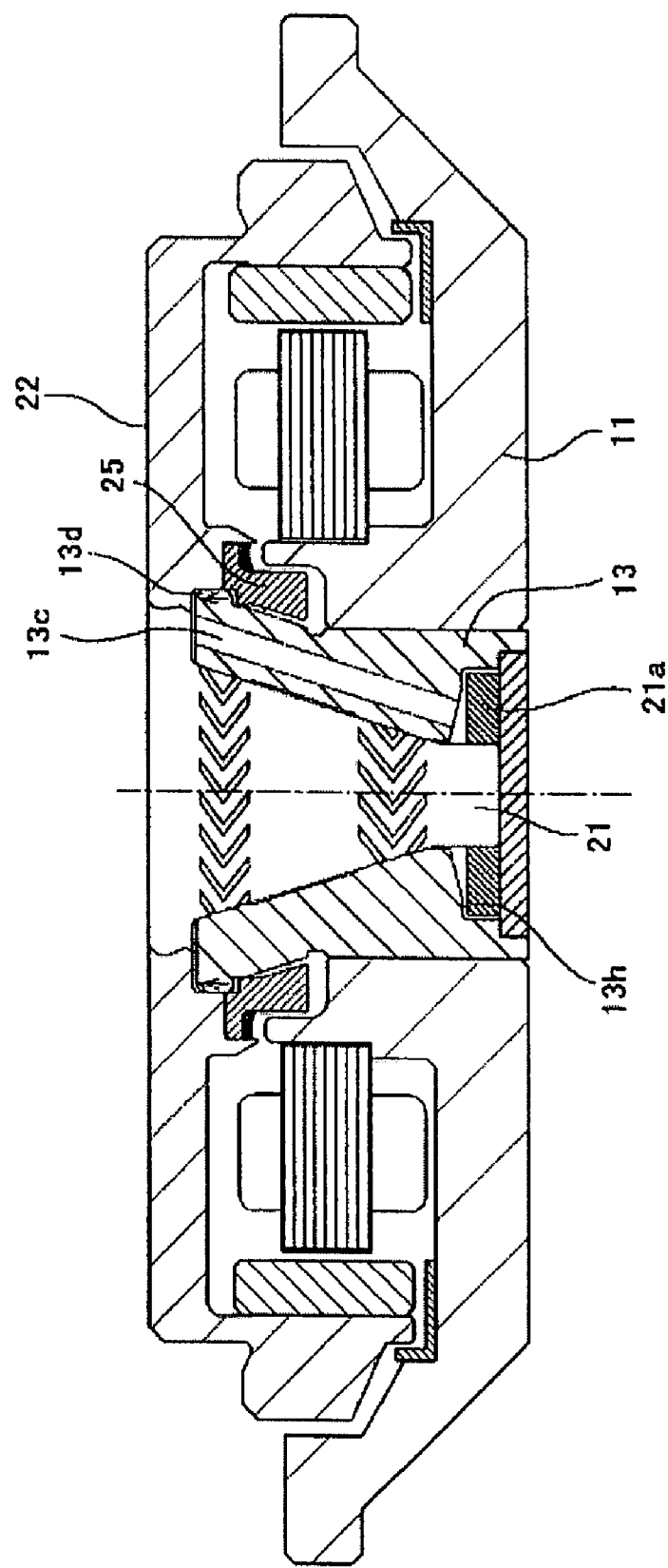
FIG. 7 is a vertical cross section of a rotary-shaft-type HDD spindle motor having the hydrodynamic bearing portion of further another embodiment of the present invention.
Figure 11:
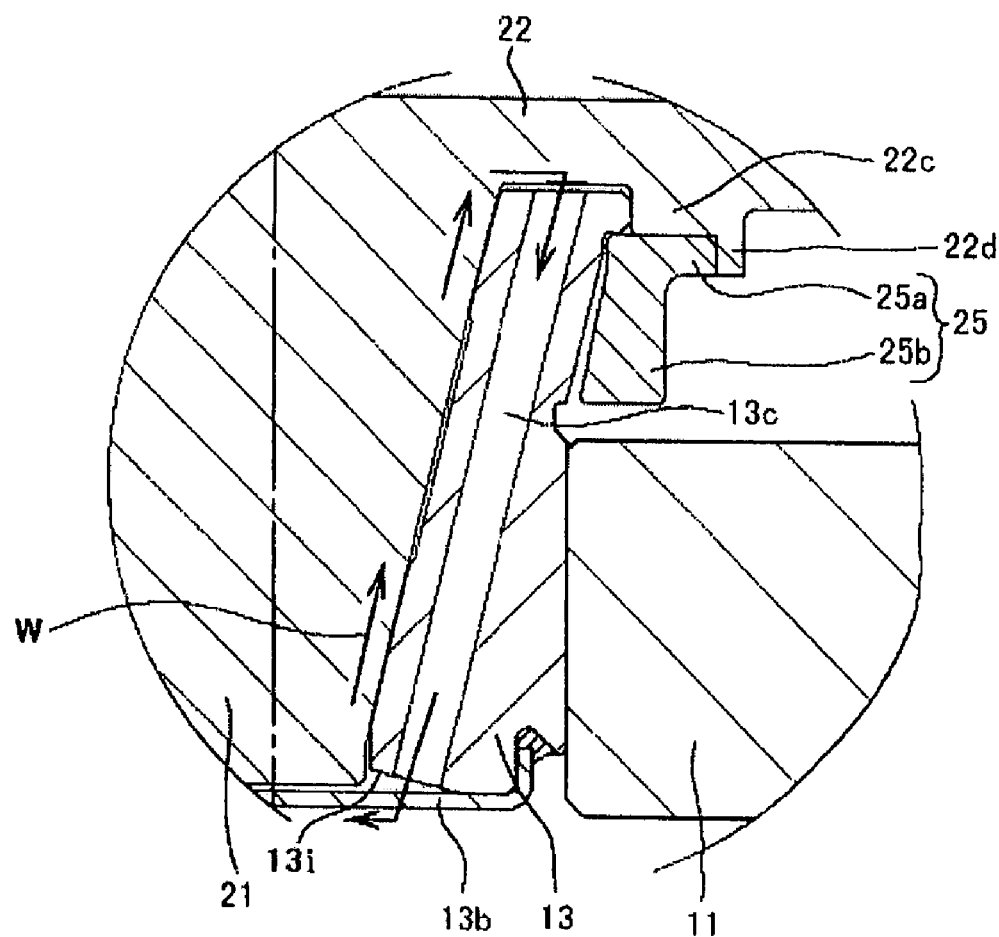
FIG. 11 is a vertical cross section of another circulation example of the lubricant fluid in the conical hydrodynamic bearing portion used in the HDD spindle motor of FIG. 9.

In the embodiment shown in FIG. 7 in which the same codes are given to the components corresponding to those of the hard disk drive (HDD) of FIG. 1, an annular stopper ring 21a is fixed to the tip end portion of the shaft bush 21 at the bottom of the figure. The stopper ring 21a is positioned inside a storage portion 13h formed as a recess in the center portion of the bearing sleeve 13 at the bottom end of the figure (FIG. 11). In this positional relationship, the stopper ring prevents the rotor assembly 20 from coming off. Even in such an embodiment, the same configuration as that of the above-mentioned fluid pressurizing means 13e, 13f, or 13g can be adopted and the same function/effects as those can be obtained.

Figure 8:
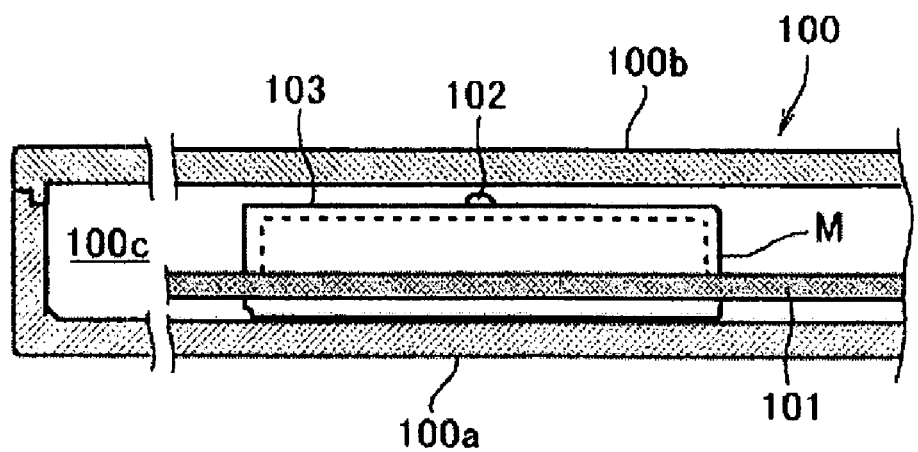
FIG. 8 is a vertical cross section of a structural example of the recording disk drive which uses the spindle motor having the hydrodynamic bearing device of the present invention.

The spindle motor of each embodiment is mounted inside a hard disk drive (HDD) as illustrated in FIG. 8. As illustrated in FIG. 8, a spindle motor M having the conical hydrodynamic bearing device of any one of the above-described embodiments is fixed to a main plate 100a that configures a sealed housing 100; the internal space of the housing 100 which now stores the spindle motor M is made to be a clean space 100c by covering it with a sealing lid 100b that fits to the main plate 100a. An information recording disk 101 such as a hard disk is mounted onto the rotary hub (see code 22 of FIG. 1) of the spindle motor M, and is held in place by a clamp 103 fixed to the rotary hub with a screw 102.

Second Embodiment

Described in detail next are a hydrodynamic bearing device in which the differential pressure between both ends of the inclined bearing space is suitably maintained to easily and certainly obtain the suitable amount of relative float between the fixed member and the rotary member, and a recording disk drive equipped with such a bearing device.

The embodiments of the present invention are described in detail hereinafter based on the drawing. Described prior to that is a hard disk drive (HDD) spindle motor having a conical hydrodynamic bearing device to which the present invention is applied.

Figure 9:
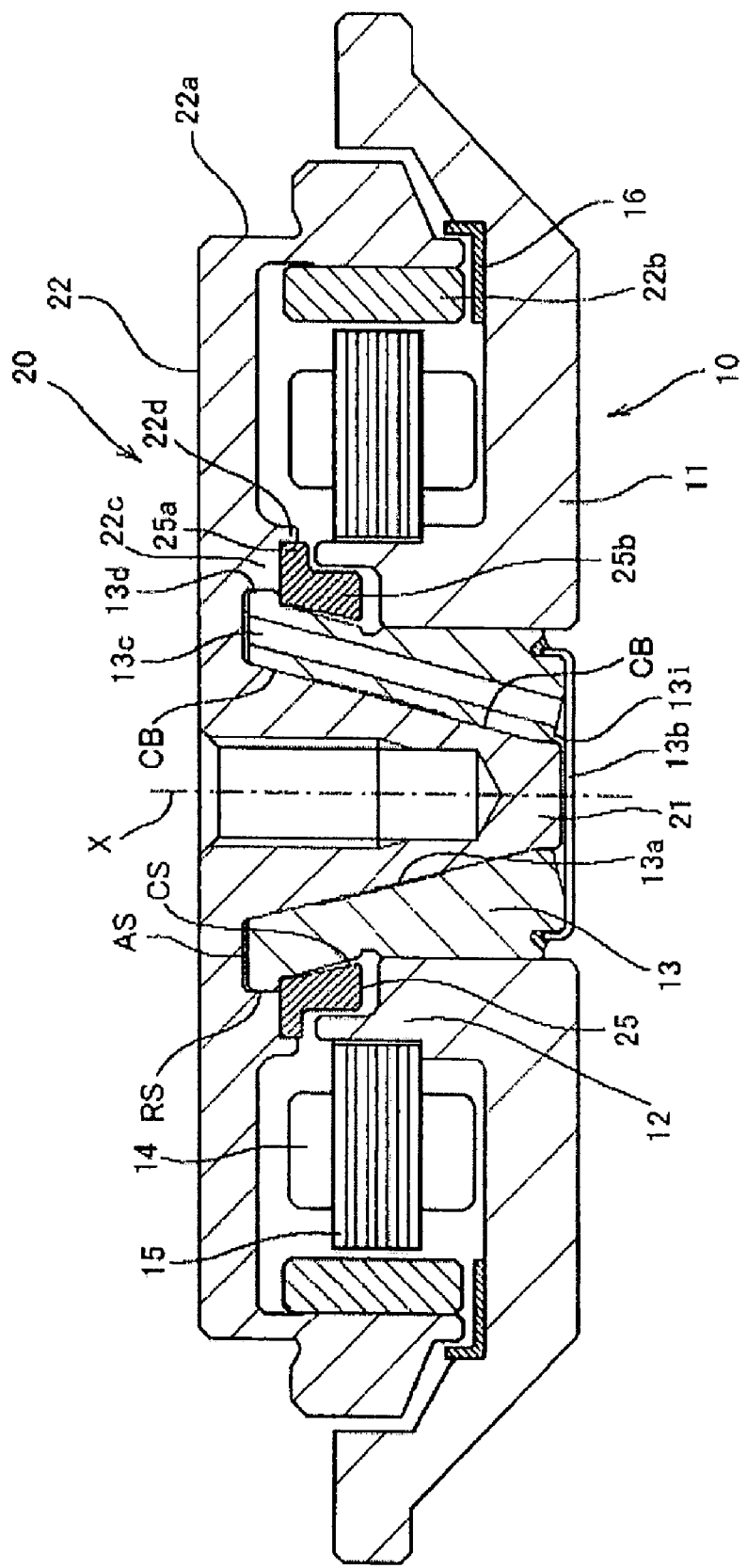
FIG. 9 is a vertical cross section of a rotary-shaft-type HDD spindle motor having a hydrodynamic bearing device of an embodiment of the present invention.

The rotary-shaft/outer rotor-type spindle motor shown in FIG. 9 comprises a stator assembly 10 as a fixed member and a rotor assembly 20 as a rotary member which is coupled to the stator assembly 10 from the top of the figure.

Note that, in the spindle motor of FIG. 9, the same codes are given to the same components as in the embodiment of FIG. 1 and their descriptions are omitted here.

Further, in the embodiment shown in FIG. 9, the fluid pressurizing means 13e, 13f, or 13g shown in FIG. 1, etc. is not provided.

In the rotary-shaft/outer rotor-type spindle motor shown in FIG. 9, the lubricant fluid pressurized by the dynamic pressure generating grooves leaks to the outside from the openings at both axial ends of the inclined bearing space including each conical hydrodynamic bearing portion CB. The lubricant fluid that has leaked to the outside is moved through the circulating hole 13c, passing at an angle in a straight line through the drum portion of the bearing sleeve 13, to form a circulation path by which the lubricant fluid is returned to the initial conical hydrodynamic bearing portions CB. With this, the differential pressure caused between the two ends of the inclined bearing space is cancelled. The configuration of the circulating hole 13c is described later.

As described above, a portion of the stopper engaging flange 13d of the bearing sleeve 13 is axially opposed to the top surface of the main portion 25b of the annular drum member 25. Because these members 13d and 25b are arranged to be able to make contact with each other in the axial direction, the rotary hub 22 is prevented from coming off in the axial direction.

Figure 10:
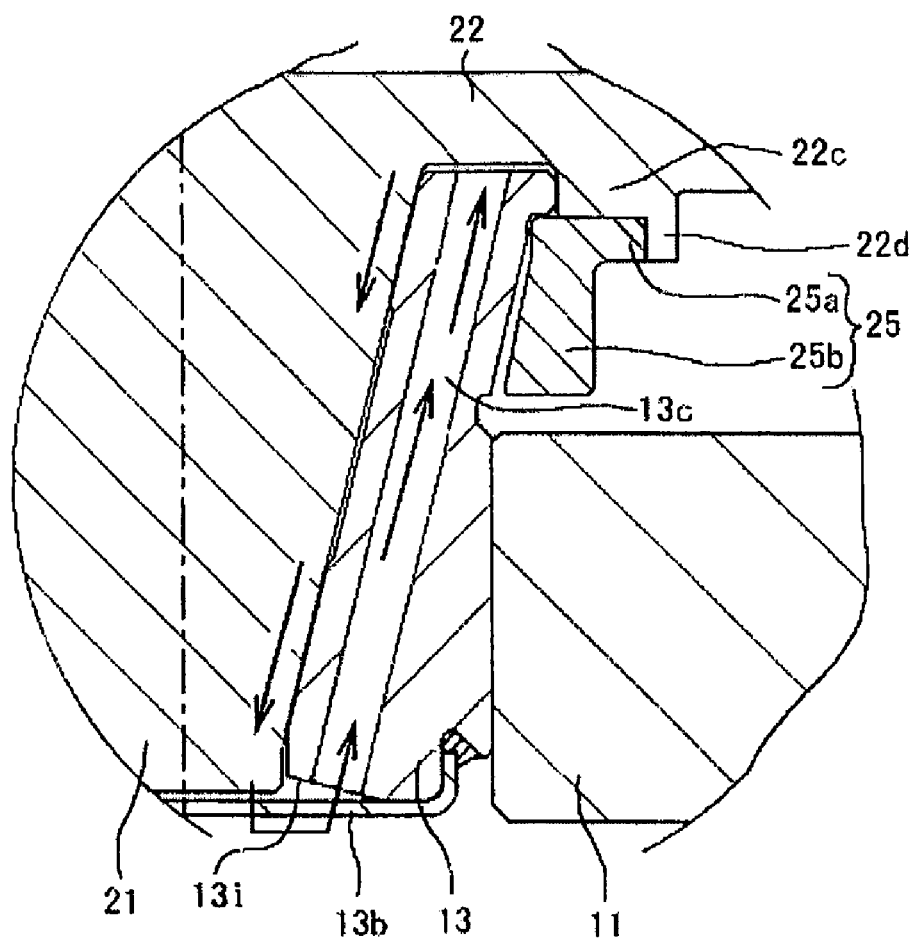
FIG. 10 is a vertical cross section of a circulation example of the lubricant fluid in the conical hydrodynamic bearing portion used in the HDD spindle motor of FIG. 9.

The circulating hole 13c formed in the bearing sleeve 13 extends nearly parallel to the inclination of the inclined bearing space. The opening of the circulating hole 13c at the bottom end of the figure opens to the bottom end surface 13i of the bearing sleeve 13 to face the space inside of the cover 13b. The opening of the circulating hole 13c at the top end of the figure opens to the top end surface of the bearing sleeve 13 to face the space AS outside of the inclined bearing space. Because of the circulating hole 13, the lubricant fluid circulation path can be created between the circulating hole 13c and the inclined bearing space. For example, as shown by the arrows in FIG. 10 or 11, the lubricant fluid is circulated.

As described above, the circulating hole 13c passes in a straight line in the bearing sleeve 13 such that it extends nearly parallel to the inclination of the inclined bearing space, and has a pair of openings, one at each end surface of the bearing sleeve 13 in the axial direction. The bottom end surface 13*i* of the bearing sleeve 13, on which the opening of the circulation hole 13*c* at the bottom end of the figure is provided, is created to be perpendicular to the passing direction of the circulating hole 13*c*. In other words, the opening of the circulating hole 13*c* at the bottom end of the figure is created in the bottom end surface 13*i* of the bearing sleeve 13 as the opening face nearly perpendicular to the hole passing direction (hereinafter denoted as the perpendicular opening face). The bottom end face 13*i* of the bearing sleeve 13 is formed with a substantially cone-shaped recess face which is nearly orthogonal to the inclined dynamic pressure surface on the inner circumferential surface of the bearing sleeve 13; and the circulating hole 13*c* intersects perpendicularly with the bottom end face 13*i* of the bearing sleeve 13, which is formed with substantially cone-shaped recessed face, to form a substantially circular opening at the intersection.

As described above, in this embodiment, the lubricant fluid is moved through the circulation path including the inclined bearing space and the circulating hole 13*c* to cancel the unbalance of the pressure of the lubricant fluid caused between the two end portions of the inclined bearing space. With this, the pressure of the lubricant fluid at both ends of the inclined bearing space is kept in balance and accordingly a suitable dynamic pressure is maintained.

To form the circulating hole 13*c*, a tool is first placed on the bottom end surface 13*i* of the bearing sleeve 13 which is nearly perpendicular to the passing direction of the circulating hole 13*c*, and is moved in that direction. In this manner, there is no displacement of the tool, forming the circulating hole 13*c* with high precision, and also the load stress is evenly applied to the tool, extending the tool life.

Also, in this embodiment, the circulating hole 13*c* is formed in the fixed member, i.e., in the bearing sleeve 13; therefore, the lubricant fluid moves smoothly in a stable manner through the circulation path including the circulating hole 13*c*.

Further, in this embodiment, the circulating hole 13*c* is formed to extend nearly in parallel to the inclined dynamic pressure surface; therefore, the bearing sleeve 13, in which the circulating hole 13*c* is formed, has extra thickness at the joint portion thereof to the base frame 11 in the radial direction. The storage capacity of the coil wires of the motor may be enlarged by the reduced outer diameter of the joint portion of the bearing sleeve to improve the rotation drive property. Therefore, the extra thickness can be eliminated from the bearing sleeve to make the outer diameter of the joint portion of the bearing sleeve 13 smaller, thus making the whole device smaller.

Figure 12:
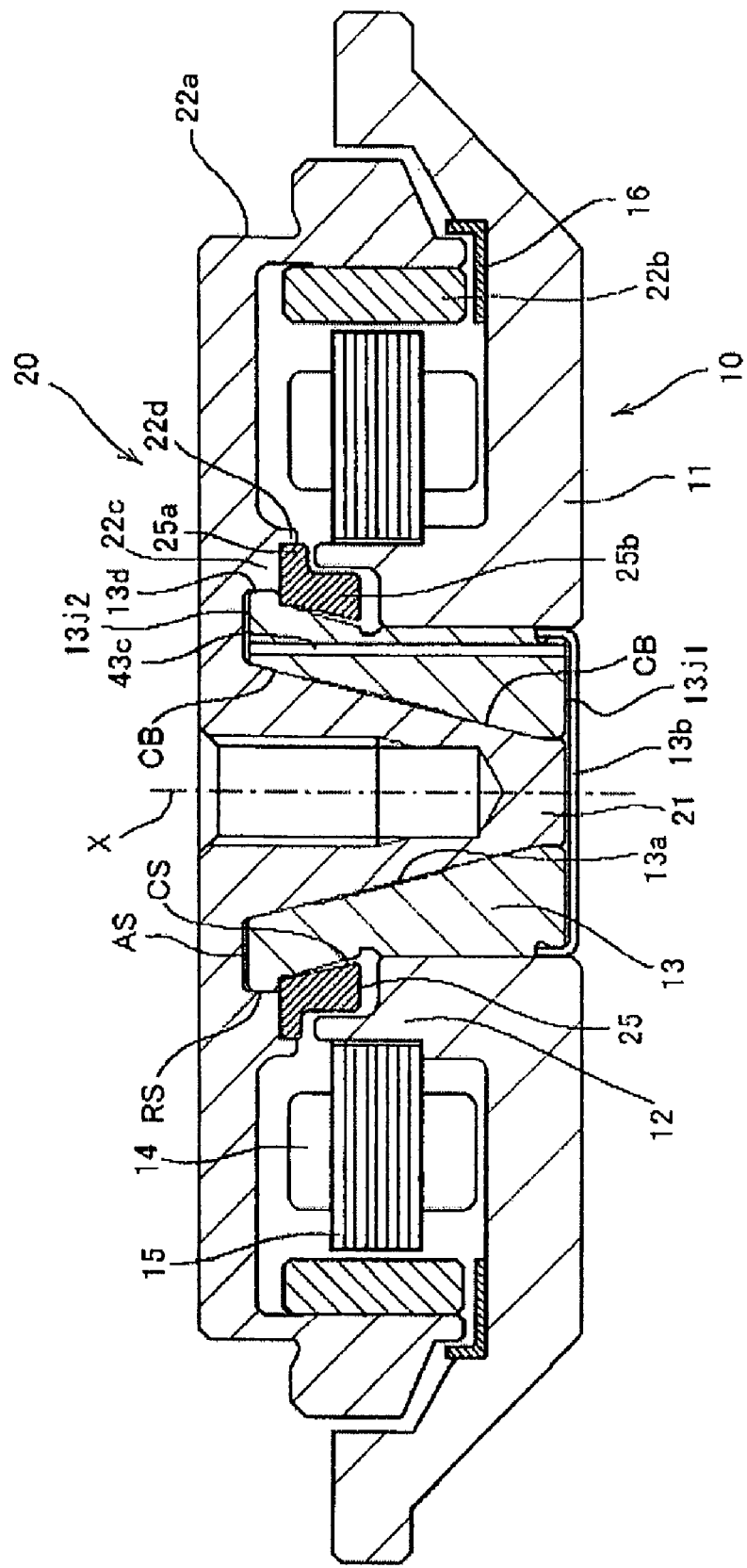
FIG. 12 is a vertical cross section of a rotary-shaft-type HDD spindle motor having a hydrodynamic bearing device of another embodiment of the invention.

In the embodiment shown by FIG. 12 in which the same codes are given to the same components as in the above-mentioned embodiments, a circulating hole 43*c* is provided to form a circulation path for the lubricant fluid such that it passes through the bearing sleeve 13 in the axial direction (in the up and down direction of the figure). In this embodiment, the bottom end surface 13*j*1 and top end surface 13*j*2 of the bearing sleeve 13 are formed with simple flat surfaces that extend in the radial direction. The circulating hole 43*c* has perpendicular opening faces at the bottom end surface 13*j*1 and top end surface 13*j*2 of the bearing sleeve 13 formed with simple flat surfaces. In other words, the circulating hole 43*c* intersects nearly perpendicularly with the bottom end surface 13*j*1 and top end surface 13*j*2 of the bearing sleeve 13, creating the substantially circular openings. Even in this embodiment, the same function/effects can be obtained as in the above-mentioned embodiment.

Figure 13:
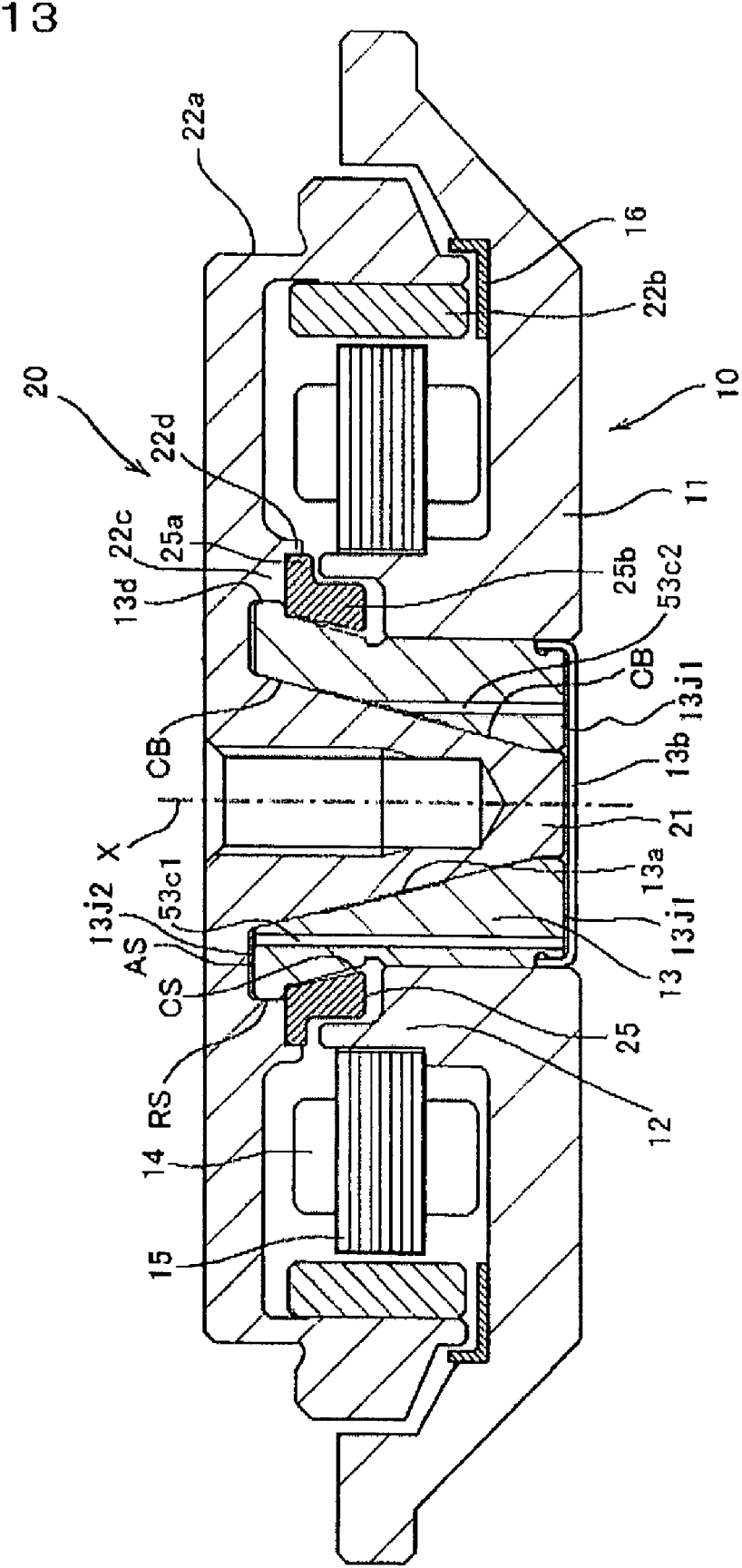
FIG. 13 is a vertical cross section of a rotary-shaft-type HDD spindle motor having a hydrodynamic bearing device of another embodiment of the invention.

In the embodiment shown by FIG. 13 in which the same codes are given to the same components as in the above-mentioned embodiments, two circulating holes 53*c*1, 53*c*2 of different lengths pass through the bearing sleeve 13 in the axial direction (in the up and down direction). The longer circulating hole 53*c*1 passes through the bearing sleeve 13 in the axial direction to communicate between the top and bottom end surfaces of the bearing sleeve 13; thus, it has openings in the perpendicular opening face at the bottom end surface 13*j*1 and the top end surface 13*j*2 of the bearing sleeve 13. On the other hand, the shorter circulating hole 53*c*2 extends from the oil reservoir between the two conical hydrodynamic bearing portions CB, CB and has an opening in the perpendicular opening face at the bottom end surface 13*j*1 of the bearing sleeve 13.

Even in such an embodiment, the same function/effects as in the above-mentioned embodiments can be obtained; however, in this embodiment especially, the circulation path is formed for each of the two conical hydrodynamic bearing portions CB, CB. Therefore, the pressure balance in the lubricant fluid can be well maintained in each conical hydrodynamic bearing portion CB. Thus, the function/effects of the above-mentioned embodiments can be obtained in a stable manner, according to the condition of the conical hydrodynamic bearing portions CB, CB at two places.

Figure 14:
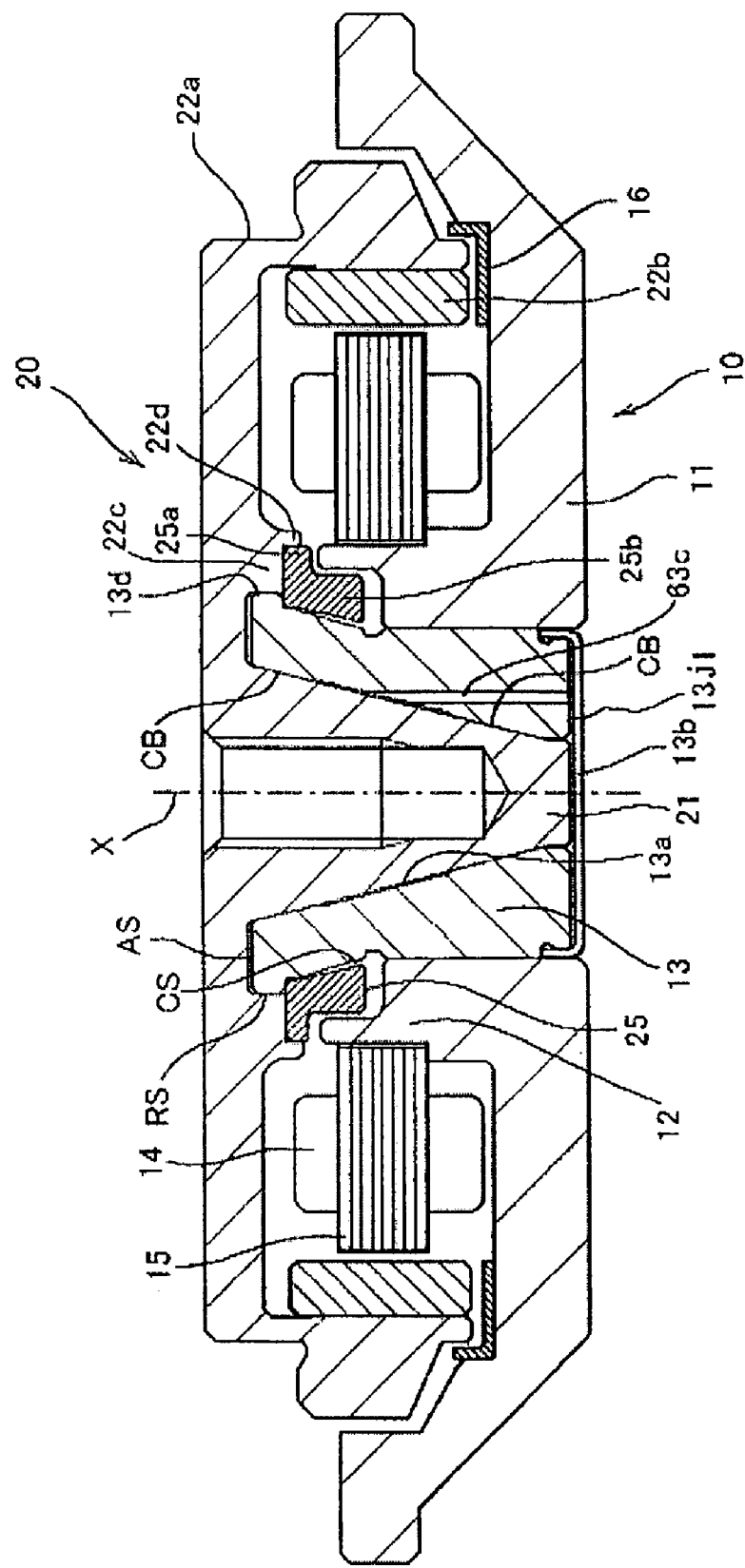
FIG. 14 is a vertical cross section of a rotary-shaft-type HDD spindle motor having a hydrodynamic bearing device of another embodiment of the invention.
Figure 15:
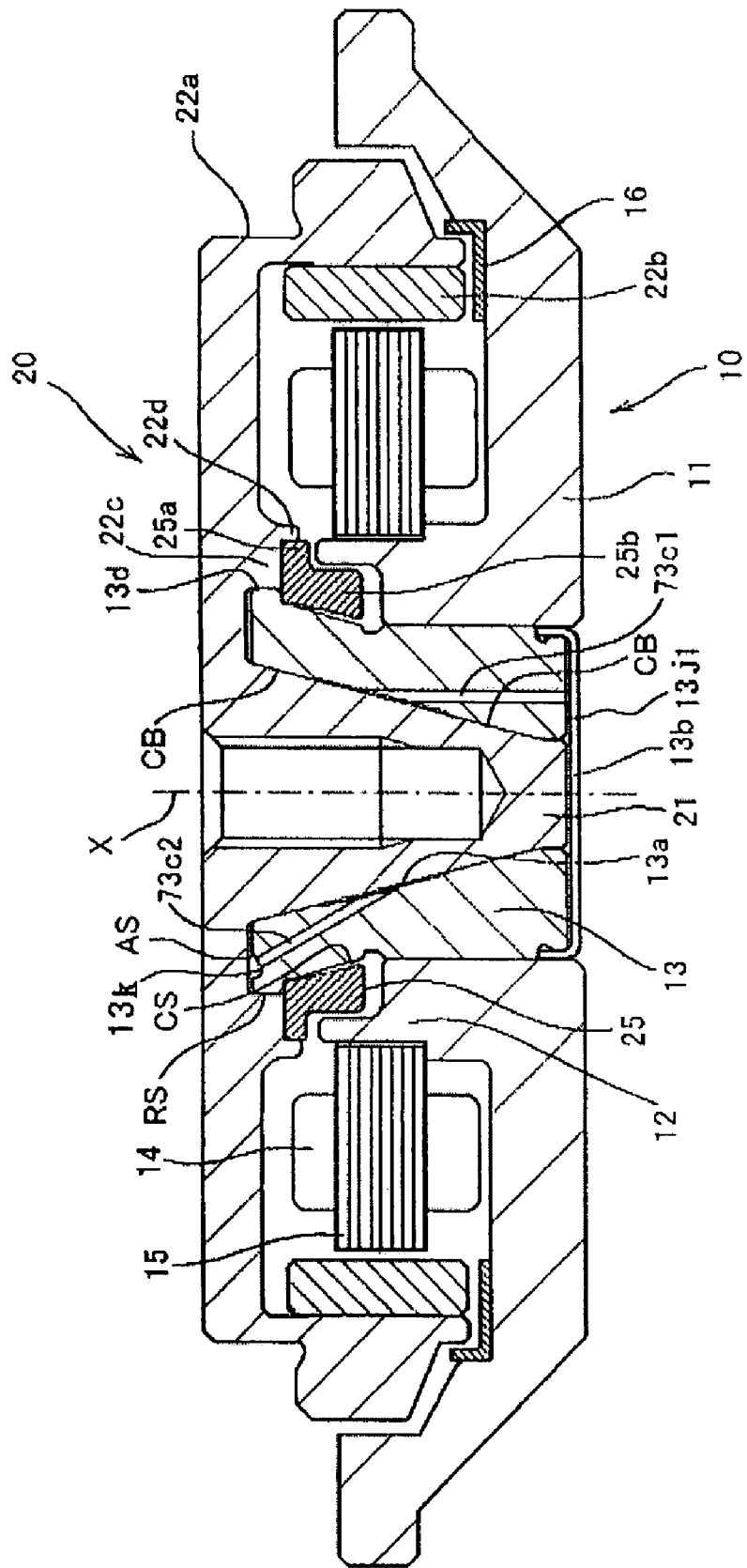
FIG. 15 is a vertical cross section of a rotary-shaft-type HDD spindle motor having a hydrodynamic bearing device of another embodiment of the invention.

In the embodiment shown by FIG. 14 in which the same codes are given to the same components as in the above-mentioned embodiments, a circulating hole 63*c* for one of the conical hydrodynamic bearing portions CB passes through the bearing sleeve 13 in the axial direction (in the up and down direction). In other words, this circulating hole 63*c* is provided to axially extend from the oil reservoir between the two conical hydrodynamic bearing portions CB, CB and opens in the perpendicular opening face at the bottom end surface 13*j*1 of the bearing sleeve 13. In this manner, the pressure balance is obtained in the conical hydrodynamic bearing portion CB on the lower side of the figure. In such an embodiment, the same function/effects as in the above-mentioned embodiments can be obtained with the conical hydrodynamic bearing portion CB at one place (on the lower side of the figure), In the embodiment shown by FIG. 15 in which the same codes are given to the same components as in the above-mentioned embodiments, two kinds of circulating holes 73*c*1 and 73*c*2 are formed for the two conical hydrodynamic bearing portions CB, CB to create the circulation path. In this manner, the lubricant fluid in each of the two conical hydrodynamic bearing portions CB, CB is circulated independently.

More specifically described, the circulating hole 73*c*1 on the right side of the figure creates the circulation path for the conical hydrodynamic bearing portion CB on the lower side of the figure; it extends from the oil reservoir between the two hydrodynamic bearing portions CB, CB, axially (in the up and down direction) passing through the bearing sleeve 13 toward the bottom side of the figure and opens in the perpendicular opening face at the bottom end surface 13*j*1 of the bearing sleeve 13. On the other hand, the circulating hole 73*c*2 on the left side of the figure creates the circulation path for the hydrodynamic bearing portion CB on the upper side of the figure; it extends from the oil reservoir between the two conical hydrodynamic bearing portions CB, CB, passing through the bearing sleeve 13 at an angle toward the upper side.

The hole passing direction of the circulating hole 73*c*2 is set in such a way that an inclined recessed surface 13*k* formed in the top end surface of the bearing sleeve 13 is the perpendicular opening face which is nearly perpendicular to the circulating hole 73c2. In other words, a tapered, inclined recessed surface 13k which is nearly orthogonal to the passing direction of the circulating hole 73c2 is formed in the top end surface of the bearing sleeve 13; the circulating hole 73c2 intersects nearly perpendicularly with the tapered, inclined recessed surface 13k, and a substantially circular opening is formed at the intersection.

Even in this embodiment, the same function/effects as in the above-mentioned embodiment can be obtained; however, especially in this embodiment, the circulation path including the circulating holes 73c1 and 73c2 is formed to function completely independently for each of the two hydrodynamic bearing portions CB, CB. Therefore, the pressure balance of the lubricant fluid in each conical hydrodynamic bearing portion CB is well maintained independently, and the function/effects of the above-mentioned embodiments can be obtained in an extremely stable manner, according to the condition of the bearing portions CB, CB.

Figure 16:
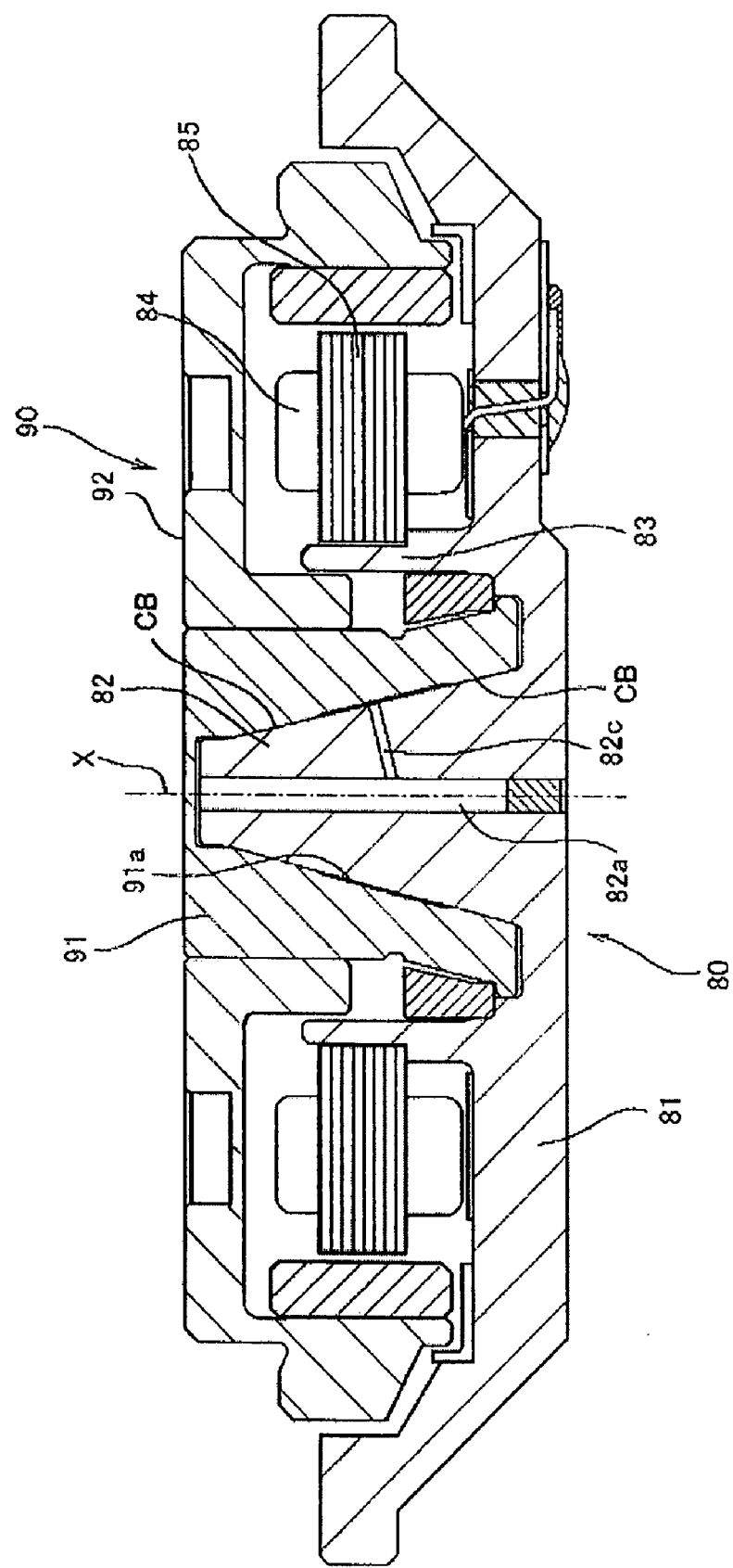
FIG. 16 is a vertical cross section of a rotary-shaft-type HDD spindle motor having a hydrodynamic bearing device of another embodiment of the invention.

In the embodiment shown by FIG. 16, the present invention is applied to a fixed-shaft/outer rotor-type spindle motor. This spindle motor comprises a stator assembly 80 as a fixed member and a rotor assembly 90 as a rotary member which is coupled to the stator assembly 80 from the top of the figure.

The stator assembly 80 has a base frame 81 which is to be screwed to the main plate of a hard disk drive (HDD) (not illustrated). About the center of the base frame 81, a shaft bush 82 as a shaft member, which is composed of substantially conical stainless steel, is integrally formed to stand upright. A core holder 83 formed by a cylindrical annular wall stands is formed integrally with the base frame 81 to stand upright at the position distanced properly from the shaft bush 82 in the radial direction. A stator core 85 in which a stator coil 84 is wound around a radially-projecting salient-pole of the stator core is fitted to the outer circumference of the core holder 83.

Also, a hollow bearing sleeve 91 of the rotor assembly 90 is inserted over the shaft bush 82 such that it can freely rotate around the central rotation axis X. The bearing sleeve 91 is composed of a copper material such as phosphor bronze to facilitate its machining, and has a substantially conical bearing center hole 91 a in which one end of the hole 91a in the axial direction (bottom end of the figure) is open and the other axial end (top end of the figure) is closed. Then, in the bearing center hole 91a at the bearing sleeve 91, the shaft bush 82 as a shaft member is rotatably inserted. A substantially conical inclined dynamic pressure surface is formed on the inner circumferential surface of the bearing center hole 91 a at the bearing sleeve 91. Another substantially inclined dynamic pressure surface is formed on the outer circumferential surface of the shaft bush 82. Note that, about center portion of the inclined dynamic pressure surface on the bearing sleeve 91, an annular depression used as an oil reservoir is formed like a belt.

Also, an inclined bearing space is formed in the small gap between the opposing, inclined dynamic pressure surfaces. In the inclined bearing space, the conical hydrodynamic bearing portions, CB and CB, are created at two places, spaced at a proper distances along the inclined dynamic pressure surface direction. More specifically, the inclined dynamic pressure surface on the bearing sleeve 91 and that on the shaft bush 82, which configures both conical hydrodynamic bearing portions CB are opposed to each other via the inclined bearing space of several 1 μm. In the bearing space BS including the inclined bearing space, an ester type or poly-α olefin type lubricant oil is filled without interruption. Since the top end of the bearing sleeve 91 is closed as mentioned above, the lubricant fluid in each of the conical hydrodynamic bearing portions CB, CB is prevented from leaking outside.

Further, a dynamic pressure generating means having a herringbone-shaped recessed groove structure (not illustrated) is cut in two blocks in the axial direction on at least one of the inclined dynamic pressure surfaces on the bearing sleeve 91 and shaft bush 82. When the shaft bush 82 is rotated, the lubricant fluid is pressurized by the pumping action of the dynamic pressure generating grooves to generate dynamic pressure, by which the bearing sleeve 91 is relatively elevated from the shaft bush 82 in the radial direction and in the thrust direction and is maintained in a non-contact manner. Thus, the bearing sleeve 91 and the rotary hub 92 integrated with or fixed to the shaft bush 91 are rotatably supported.

The lubricant fluid pressurized by the dynamic pressure generating grooves in the above manner runs outside from the openings at both axial ends of the inclined bearing space including the conical hydrodynamic bearing portions CB, CB. Through a circulating hole 82c passing at an angle through the shaft bush 82, the above-mentioned lubricant fluid that has come outside is returned to the conical hydrodynamic bearing portions CB.

In other words, the end portion of the circulating hole 82c on the inner circumference side opens in the middle of a central path 82a formed along the central axis of the shaft bush 82. The opening at the end portion of the circulating hole 82c on the outer circumference side is formed in such a way that the inclined dynamic pressure surface on the outer circumference of the shaft bush 82 is used as the perpendicular opening face, and faces the inclined hydrodynamic bearing space. Thus, the circulating hole 82c is provided in this manner so that the circulation path of the lubricant fluid is formed between the circulating hole 82c and the inclined hydrodynamic bearing space to circulate the lubricant fluid. Note that the central path 82a is formed such that the open end of the bearing sleeve 91 at the bottom end of the figure is closed.

The circulating hole 82c passes through the shaft bush 82 in such a direction that the inclined dynamic pressure surface on the outer circumference of the shaft bush 82 is the perpendicular opening face. The circulating hole 82c intersects nearly perpendicularly with the inclined dynamic pressure surface on the outer circumference of the shaft bush 82, and a substantially circular opening is formed at the intersection.

The rotary hub 92 which together with the bearing sleeve 91 configures the rotor assembly 90 is formed in a cup-like shape so that various kinds of information recording media disks such as magnetic disks can be mounted thereon, and integrally joined with the bearing sleeve 91 using a mechanical joining means such as press fitting. Since the configuration of the rotary hub 92 remains the same as that of the embodiments of a rotary-shaft-type spindle motor, its description is omitted here. Even in such a fixed-shaft-type spindle motor, the same function/effects as in the embodiments of a rotary-shaft-type spindle motor can be obtained.

The spindle motor of each of the embodiments of FIGS. 9 through 16 is mounted inside a hard disk drive (HDD) as illustrated in FIG. 8. As illustrated in FIG. 8, a spindle motor M having a conical hydrodynamic bearing device of any one of the above-described embodiments is fixed to a main plate 100a that configures a sealed housing 100; the internal space of the housing 100 which now stores the spindle motor M is made to be a clean space 100c by covering it with a sealing lid 100b that fits to the main plate 100a. An information recording disk 101 such as a hard disk is mounted onto the rotary hub (see code 22 of FIG. 9) of the spindle motor M, and is held in place by a clamp 103 fixed to the rotary hub with a screw 102.

Although the invention devised by the present inventors has been described in detail based on the embodiments, it is not limited to the above-described embodiments, but can be varyingly modified within the scope of the invention.

For example, although the circulating hole 13c for the lubricant fluid is formed in the bearing sleeve 13 in the above-described embodiments, the present invention can be applied to the device that does not have such a circulating hole.

Also, although the circulating hole for the lubricant fluid is formed in the fixed member in the above-described embodiments, it can be formed in the rotary member.

Further, although the present invention is applied to a hard disk (HDD) spindle motor in the above embodiments, it can be applied in the same manner to various other conical hydrodynamic bearing devices.

Third Embodiment

Described in detail next are a hydrodynamic bearing device having a simple configuration in which bubble formation is well prevented to obtain a stable dynamic pressure property for a long duration, and a disk drive device (having such a bearing device).

The embodiments of the present invention are described in detail hereinafter based on the drawing. Prior to the description, a hard disk drive (HDD) spindle motor is first described as an example in which a hydrodynamic bearing device of the present invention is applied.

Figure 17:
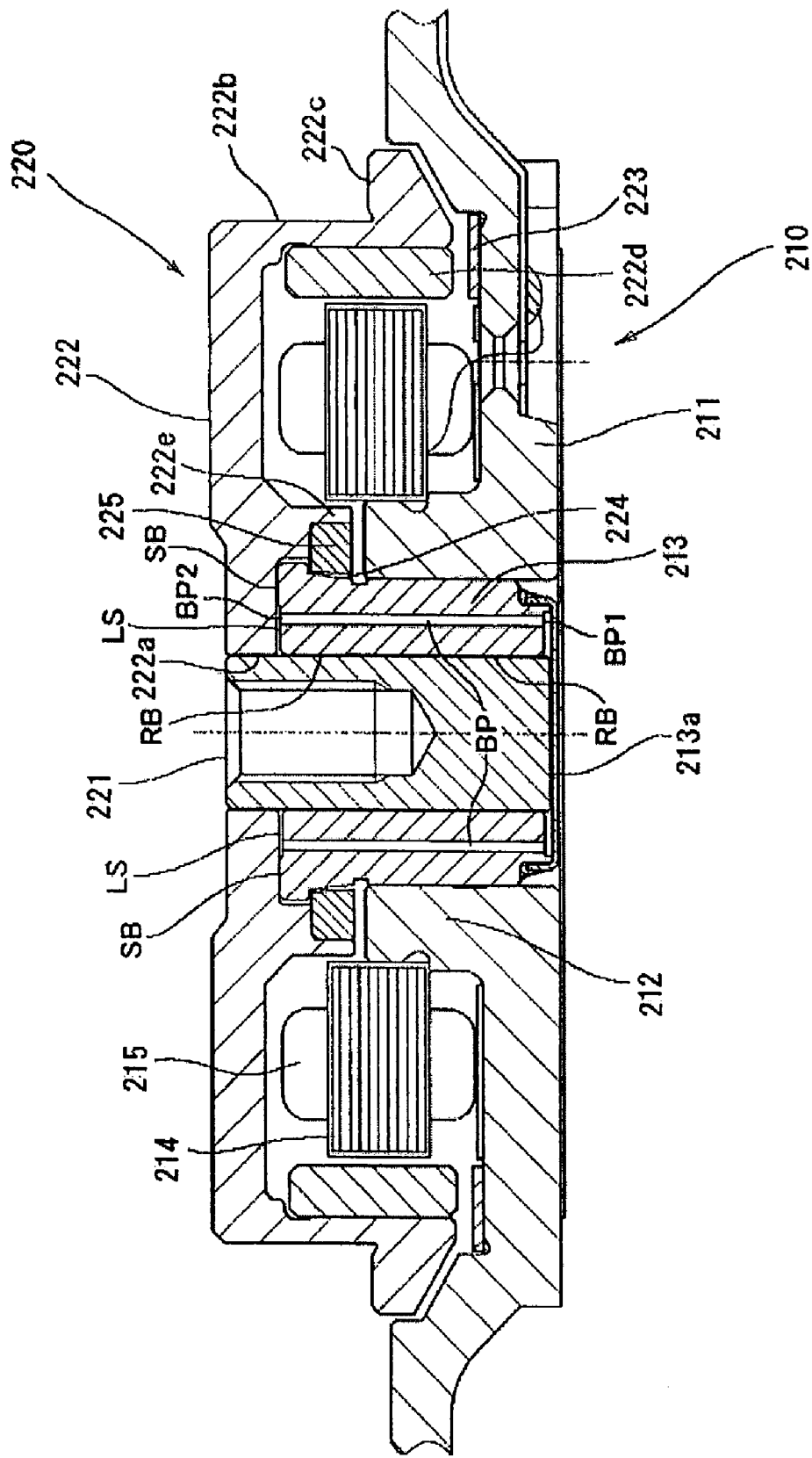
FIG. 17 is a vertical cross section of a rotary-shaft-type HDD spindle motor having a hydrodynamic bearing device of an embodiment of the invention.

The rotary-shaft-type spindle motor as illustrated in FIG. 17 comprises a stator assembly 210 as a fixed member and a rotor assembly 220 as a rotary member which is coupled to the stator assembly 210 from the top of the figure. The stator assembly 210 has a fixed frame 211 which is to be screwed to a fixed base (not illustrated). This fixed frame 211 is composed of aluminum-type metallic material to lighten the device. A hollow cylindrical bearing sleeve 213 as a hydrodynamic bearing member is joined by press fit or shrink fit with the inner circumferential surface of an annular bearing holder 212 which is formed upright in the center of the fixed frame 211. The bearing sleeve 213 is composed of copper-type material such as phosphor bronze to facilitate the cutting of a smaller diameter portion.

A stator core 214 composed of laminated electromagnetic steel sheets is fitted to the outer circumferential mounting surface of the bearing holder 212. Also, a drive coil 215 is wound around each salient-pole provided at the stator core 214.

Figure 18:
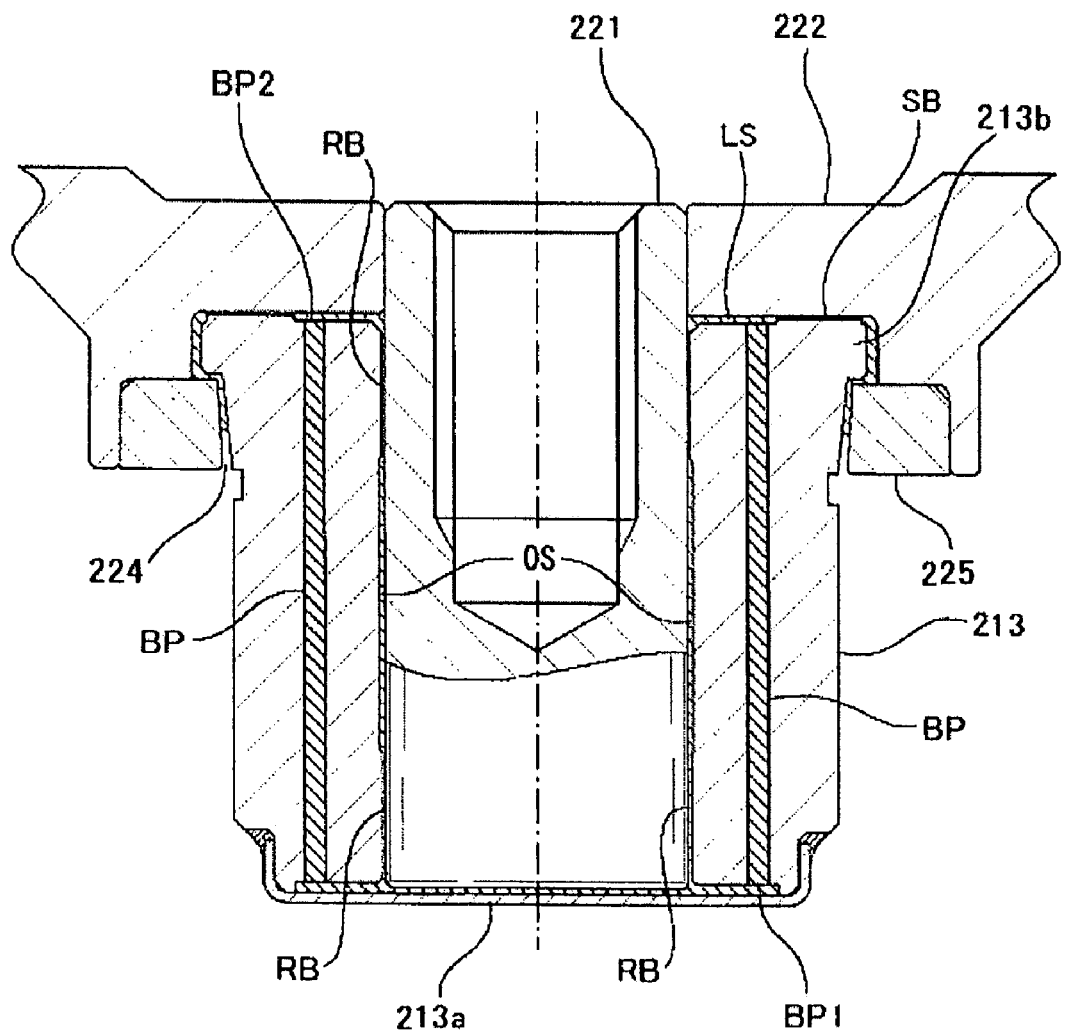
FIG. 18 is a magnified vertical cross section of the hydrodynamic bearing portion in the HDD spindle motor of FIG. 17.

As illustrated in FIG. 18, a rotary shaft 221 configuring the rotor assembly 220 is rotatably inserted in the center hole provided in the bearing sleeve 213 as the hydrodynamic bearing member. In other words, the dynamic pressure surface formed on the inner circumferential wall of the bearing sleeve 213 is radially opposed to the dynamic pressure surface formed on the outer circumferential surface of the rotary shaft 221. Two radial hydrodynamic bearing portions RB, RB are spaced at a proper distance in the axial direction in the bearing space of the small gap created between the above-mentioned dynamic pressure surfaces. More specifically, the dynamic pressure surface on the bearing sleeve 213 and the dynamic pressure surface on the rotary shaft 221 in the radial hydrodynamic bearing portions RB are circumferentially opposed to each other via a minute gap of several μm, and the lubricant fluid such as lubricant oil or magnetic fluid is injected or interposed in the bearing space of the minute gap to be continuous in the axial direction.

Further, radial dynamic pressure generating grooves having a proper structure are annularly cut in two blocks in the axial direction on at least one of the inclined dynamic pressure surfaces on the bearing sleeve 213 and rotary shaft 221. When the rotary shaft 221 is rotated, the lubricant fluid is pressurized by the pumping action of the dynamic pressure generating grooves to generate dynamic pressure, by which the rotary hub 222 (described later) together with the rotary shaft 221 is radially supported with respect to the bearing sleeve 13 in a non-contact manner.

Figure 24:
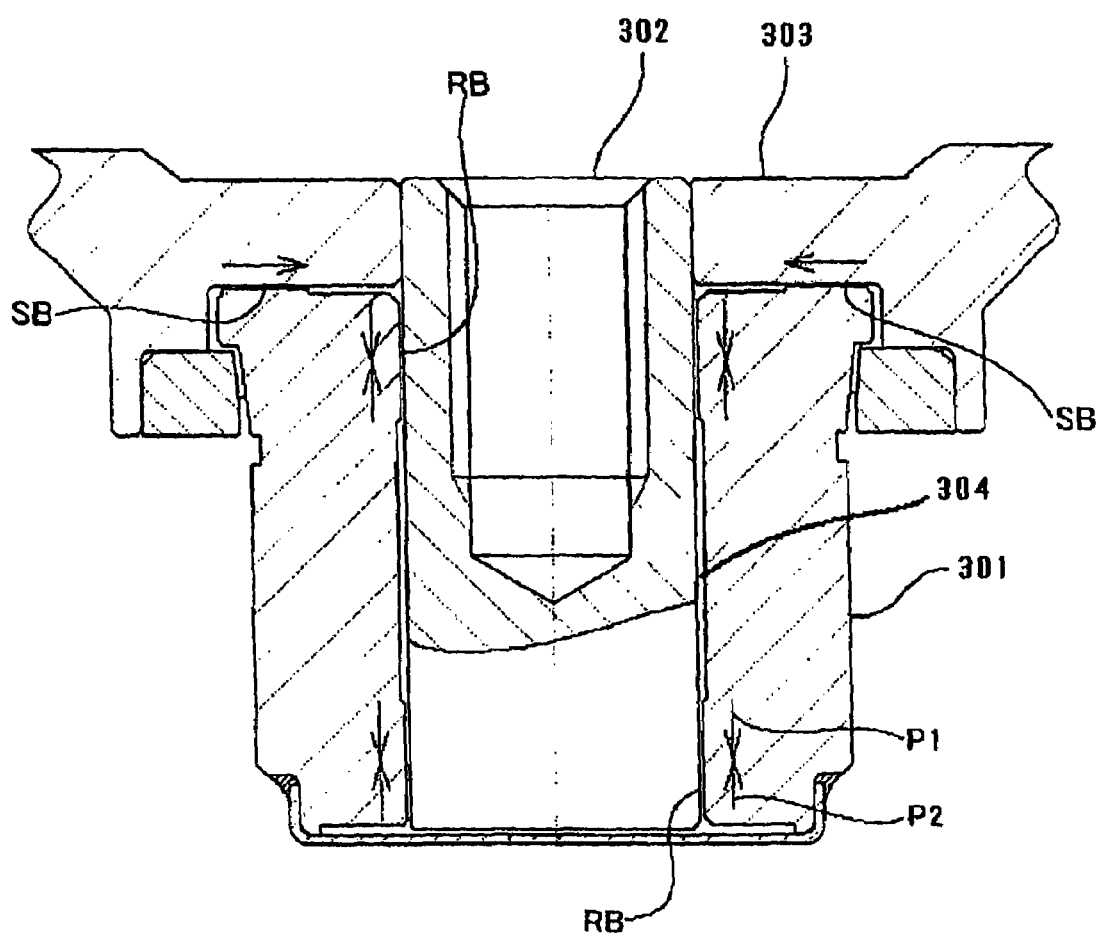
FIG. 24 is a vertical cross section of an example of the unbalance condition in the hydrodynamic bearing device of FIG. 23.

The radial dynamic pressure generating grooves cut in each radial hydrodynamic bearing portion RB are composed of an annular group of herringbone bent grooves which are substantially in the "<" shape. The herringbone-shaped groove is axially symmetric about the center point of the bent shape, and the pumping action of the radial dynamic pressure generating grooves having such a symmetric groove shape is performed symmetrically in balance in the axial direction, as shown by the arrows in FIG. 24.

In design, the lubricant fluid is not supposed to be pushed in a single axial direction by the balanced pumping action of each of the radial hydrodynamic bearing portions RB. However, in real manufacturing, manufacturing errors in the gap dimension at each radial hydrodynamic bearing portion RB, the groove shape (groove length) of the dynamic pressure generating grooves, etc. cause the unbalanced pumping action. For this reason, in this embodiment, multiple pressure-adjusting bypasses BP are formed to pass through the bearing sleeve 213 in the axial direction. The detail of the pressure-adjusting bypasses will be described later.

The rotary hub 222 which configures the rotor assembly 220 together with the rotary shaft 221 is formed with a cup-shaped member composed of ferrite-type stainless steel. A joining hole 222a provided in the center of the rotary hub 222 is integrally joined with the top end of the rotary shaft 221 by press fitting or shrink fitting. The rotary hub 222 has a substantially cylindrical drum portion 222b on the outer circumference thereof for mounting recording media disks such as magnetic disks, and also has a disk mounting portion 222c which projects from the drum portion 222b radially outside to support the recording media disk in the axial direction. The recording media disk is to be fixed on the disk mounting portion 222c with the pressing force from the top of the figure by a screwed clamp (not illustrated) covering the top of the figure.

An annular drive magnet 222d is attached to the inner circumferential wall of the drum portion 222b of the rotary hub 222. The inner circumference of the annular drive magnet 222d is closely and annularly opposed to the outer circumferential end surface of each salient-pole of the stator core 214; the axial bottom end surface of the annular drive magnet 222d is axially opposed to a magnetic attraction sheet 223 attached to the fixed frame 211. By the magnetic attraction between both members 222d and 223, the entire rotary hub 222 is attracted in the axial direction, thus obtaining a stable rotation.

The opening of the bearing sleeve 213 at the bottom end of the figure is covered sealed by a cover 213a so that the lubricant fluid inside of each radial hydrodynamic bearing portion RB does not leak to the outside.

Also, the top end surface of the bearing sleeve 213 and the bottom end surface of the rotary hub 222 in the center are arranged to closely oppose each other in the axial direction. The area created in the thrust direction between the top end surface of the bearing sleeve 213 and the bottom end surface of the rotary hub 222 is formed as a bearing space that is continuous from the radial hydrodynamic bearing portions RB. Also, a thrust hydrodynamic bearing portion SB is provided in the bearing space that continues from the radial hydrodynamic bearing portions RB. In other words, the spiral-shaped or herringbone-shaped thrust dynamic pressure generating grooves are formed on at least one of the opposing dynamic pressure surfaces 213 and 222, which configures the above-mentioned thrust opposing area.

The dynamic pressure surface of the bearing sleeve 213 at the top end of the figure and that of the rotary hub 222 at the bottom end of the figure, together which configures the thrust hydrodynamic bearing portion SB, are axially opposed to each other via a gap of several µm. In the bearing space composed of the minute gap, the lubricant fluid such as oil or magnetic fluid is filled continuously from the radial hydrodynamic bearing portions RB. During the rotation, the lubricant fluid is pressurized by the pumping action of the thrust dynamic pressure generating grooves to generate dynamic pressure, by which the rotary shaft 221 and rotary hub 222 are (relatively) elevated in the thrust direction and supported in a non-contact manner.

Note that the thrust hydrodynamic bearing portion SB in this embodiment is arranged at the outmost circumference within the area created in the thrust direction between the top end surface of the bearing sleeve 213 and the bottom end surface of the rotary hub 222, and has the pumping function to pressurize the lubricant fluid, which is filled in the entire thrust opposing area including the thrust hydrodynamic bearing portion SB, toward the radially inside.

Further, a fluid sealing portion, which is a capillary sealing portion 224, is created with the outmost circumferential wall of the bearing sleeve 213 as the hydrodynamic bearing member. In other words, the capillary sealing portion 224 as the fluid sealing portion is formed continuously from the thrust opposing area, including the thrust hydrodynamic bearing portion SB, at the radially outside. The capillary sealing portion 24 is created between the outer circumferential wall of the bearing sleeve 213 and the inner circumferential wall of a counter plate 225 which is provided as a stopper member opposing the outer circumferential wall of the bearing sleeve 213 in the radial direction. The counter plate 225 is composed of a ring-like member fixed to a flange portion 222e of the rotary hub 222. The gap between the inner circumferential wall of the counter plate 225 and the outer circumferential wall of the bearing sleeve 213 is gradually (continuously) enlarged toward the opening at the lower side of the figure so that the capillary sealing portion 224 is formed as a tapered sealing space. The lubricant fluid is continuously filled from the thrust hydrodynamic bearing portion SB to the capillary sealing portion 224.

Also, a stopper flange 213b is provided at the top end portion of the bearing sleeve 213 to project outside in the radial direction. A portion of the stopper flange 213b is axially opposed to a portion of the counter plate 225. By both members 213b and 225, the rotary hub 222 is prevented from coming off in the axial direction.

The previously-mentioned multiple pressure-adjusting bypasses BP pass through the bearing sleeve 213, separately from the bearing space including each radial hydrodynamic bearing portion RB, and have openings BP1 and BP2 at the axial ends of the bearing sleeve 213. The opening BP2 which is arranged at the top end of the bearing sleeve 213 in the figure opens in the bearing space between the thrust hydrodynamic bearing portion SB and the radial hydrodynamic bearing portion RB on the upper side of the figure, adjacent to the thrust hydrodynamic bearing portion SB.

In other words, the opening BP2 of the pressure-adjusting bypasses BP at the upper side of the figure open in an enlarged gap portion LS at the radially inside of the thrust hydrodynamic bearing portion SB, in which the axial distance is greater than the thrust hydrodynamic bearing portion SB. Because of the enlarged gap portion LS, an excellent communication is created between the pressure-adjusting bypasses BP and the bearing space, allowing the lubricant fluid to flow well.

The opening BP1 of the pressure-adjusting bypasses BP at the lower side of the figure opens in the axially outside space between the bottom end surface of the bearing sleeve 213 and the cover 213a.

In this embodiment, in addition to providing such pressure-adjusting bypasses BP, a fluid reservoir OS is provided in the bearing space between the two radial hydrodynamic bearing portions RB and RB. A fluid reservoir OS is created in the gap space which is formed by radially enlarging the bearing space configuring the radial hydrodynamic bearing portions RB, so that the lubricant fluid injected inside the bearing space can be stored in the fluid reservoir OS. A pumping power is applied to the lubricant fluid in the two radial hydrodynamic bearing portions RB, RB to maintain the lubricant fluid in the fluid reservoir OS at a positive pressure, which is greater than the atmospheric pressure.

More specifically described, the bearing space which configures at least one of the two radial hydrodynamic bearing portions RB, RB is formed to be a tapered space by enlarging the gap dimension of the bearing space toward the fluid reservoir OS or to be a paralleled space maintaining the equal gap dimension. Such a bearing space may be created by extending the inner circumferential wall of the bearing sleeve 13 in parallel to the central axis or at an angle, or by extending the outer circumferential wall of the rotary shaft 21 in parallel to the central axis or at an angle.

In the embodiment shown by FIG. 19(a), the bearing space configuring the radial hydrodynamic bearing portion RB at the upper side of the figure is created to be a tapered space in which the gap dimension of the bearing space is gradually (continuously) reduced toward the fluid reservoir OS. On the other hand, the bearing space configuring the radial hydrodynamic bearing portion RB at the lower side of the figure is created to be a tapered space in which the gap dimension of the bearing space is gradually (continuously) increased toward the fluid reservoir OS.

In the embodiment shown by FIG. 19(b), the bearing space configuring the radial hydrodynamic bearing portion RB at the upper side of the figure is created to be a tapered space in which the gap dimension of the bearing space is gradually (continuously) reduced toward the fluid reservoir OS. On the other hand, the bearing space configuring the radial hydrodynamic bearing portion RB at the lower side of the figure is created to be a paralleled space in which the gap dimension of the bearing space remains nearly the same toward the fluid reservoir OS.

In the embodiment shown by FIG. 19(d), the bearing space configuring the radial hydrodynamic bearing portion RB at the upper side of the figure is created to be a paralleled space in which the gap dimension of the bearing space remains nearly the same toward the fluid reservoir OS. On the other hand, the bearing space configuring the radial hydrodynamic bearing portion RB at the lower side of the figure is created to be a tapered space in which the gap dimension of the bearing space is gradually (continuously) increased toward the fluid reservoir OS.

In the embodiment shown by FIG. 19(e), each bearing space in the two radial hydrodynamic bearing portions RB, RB is respectively created to be a paralleled space in which the gap dimension of the bearing space remains nearly the same toward the fluid reservoir OS.

Figure 19:
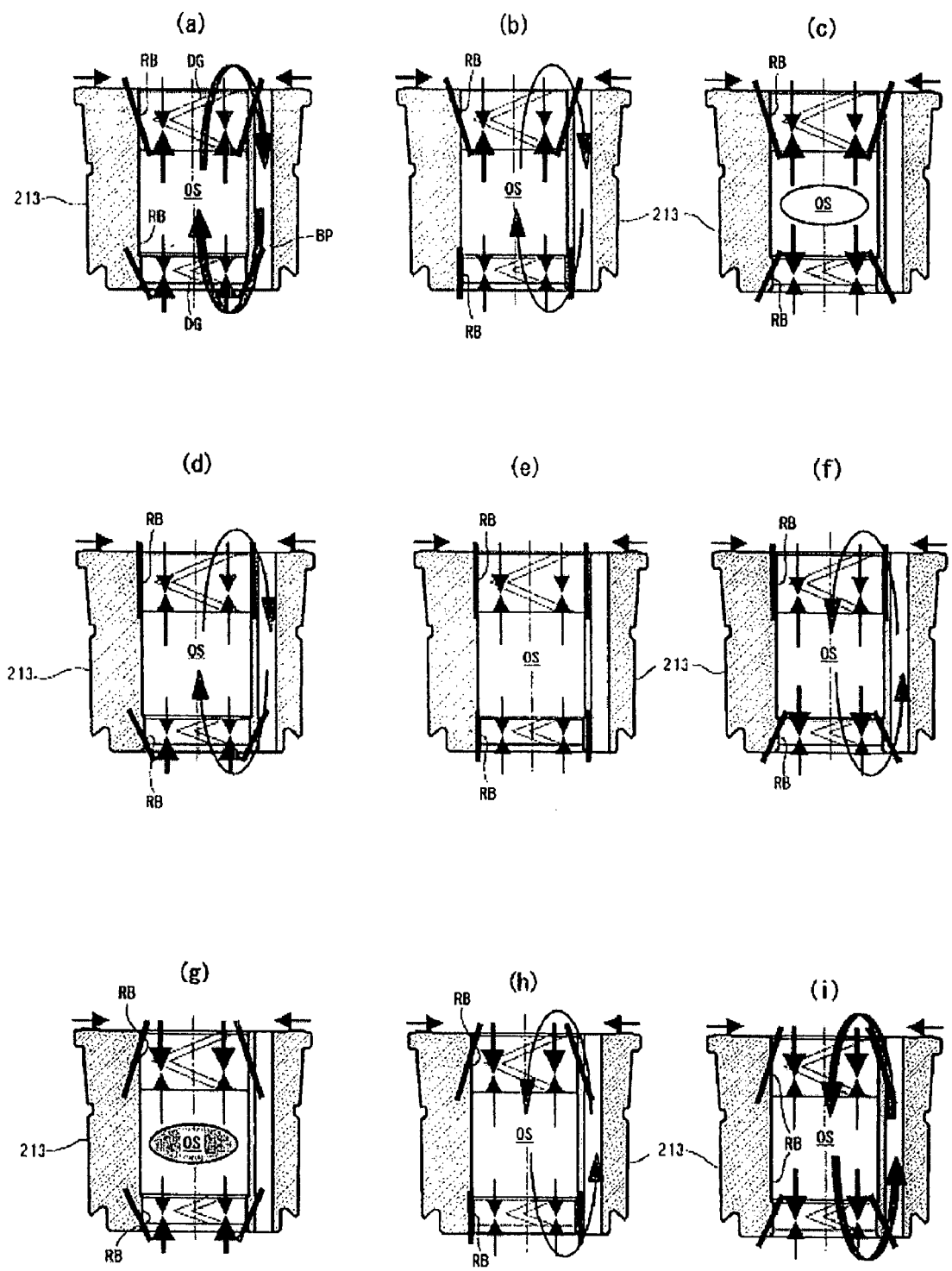
FIG. 19 is vertical cross sections of the tapered inner circumferential wall of the bearing sleeve: (c) is a conventional configuration; (a) (b) (d) through (i) show each embodiment respectively to which the present invention is applied.

In the embodiment shown by FIG. 19(*f*), the bearing space configuring the radial hydrodynamic bearing portion RB at the lower side of the figure is created to be a tapered space in which the gap dimension of the bearing space is gradually (continuously) reduced toward the fluid reservoir OS. On the other hand, the bearing space configuring the radial hydrodynamic bearing portion RB at the upper side of the figure is created to be a paralleled space in which the gap dimension of the bearing space remains nearly the same toward the fluid reservoir OS.

In the embodiment shown by FIG. 19(*g*), each bearing space in the two radial hydrodynamic bearing portions RB, RB is respectively created to be a tapered space in which the gap dimension of the bearing space is gradually (continuously) increased toward the fluid reservoir OS.

In the embodiment shown by FIG. 19(*h*), the bearing space configuring the radial hydrodynamic bearing portion RB at the upper side of the figure is created to be a tapered space in which the gap dimension of the bearing space is gradually (continuously) increased toward the fluid reservoir OS. On the other hand, the bearing space configuring the radial hydrodynamic bearing portion RB at the lower side of the figure is created to be a paralleled space in which the gap dimension of the bearing space remains nearly the same toward the fluid reservoir OS.

In the embodiment shown by FIG. 19(*i*), the bearing space configuring the radial hydrodynamic bearing portion RB at the lower side of the figure is created to be a tapered space in which the gap dimension of the bearing space is gradually (continuously) reduced toward the fluid reservoir OS. On the other hand, the bearing space configuring the radial hydrodynamic bearing portion RB at the upper side of the figure is created to be a tapered space in which the gap dimension of the bearing space is gradually (continuously) increased toward the fluid reservoir OS.

According to the embodiments shown by FIG. 19 having the above-mentioned configurations, the inside of the fluid reservoir OS provided in the center portion of the bearing space which includes the two radial hydrodynamic bearing portions RB, RB and the thrust hydrodynamic bearing portion SB is maintained at a positive pressure, which is greater than the atmospheric pressure, by the pumping power to the lubricant fluid in the radial hydrodynamic bearing portions RB. For example, in the embodiments of FIGS. 19(*e*) and 19(*g*), the entire bearing space including the fluid reservoir OS is maintained at a positive pressure, as shown by a one-dotted line (e) and a solid line (g) in FIG. 20. Thus, bubble formation in the lubricant fluid is well prevented, obtaining suitable dynamic pressure in a stable manner.

Some conventional devices, as illustrated FIG. 19(*e*), are configured such that the bearing space in the two radial hydrodynamic bearing portions RB, RB is formed to be a tapered space in which the gap dimension of the bearing space is gradually (continuously) reduced toward the fluid reservoir OS. In this case, the pumping power to the lubricant fluid in both radial hydrodynamic bearing portions RB makes the inside of the bearing space, especially, the inside of the fluid reservoir OS at a negative pressure, which is smaller than the atmospheric pressure as illustrated by the broken line (c) in FIG. 20, and this may generate bubbles in the lubricant fluid.

At that time, if the bearing space configuring the radial hydrodynamic bearing portion which is axially longer is formed to be a tapered space, the above-mentioned function/effects can be obtained by the radial hydrodynamic bearing portion having a larger pumping power.

Figure 20:
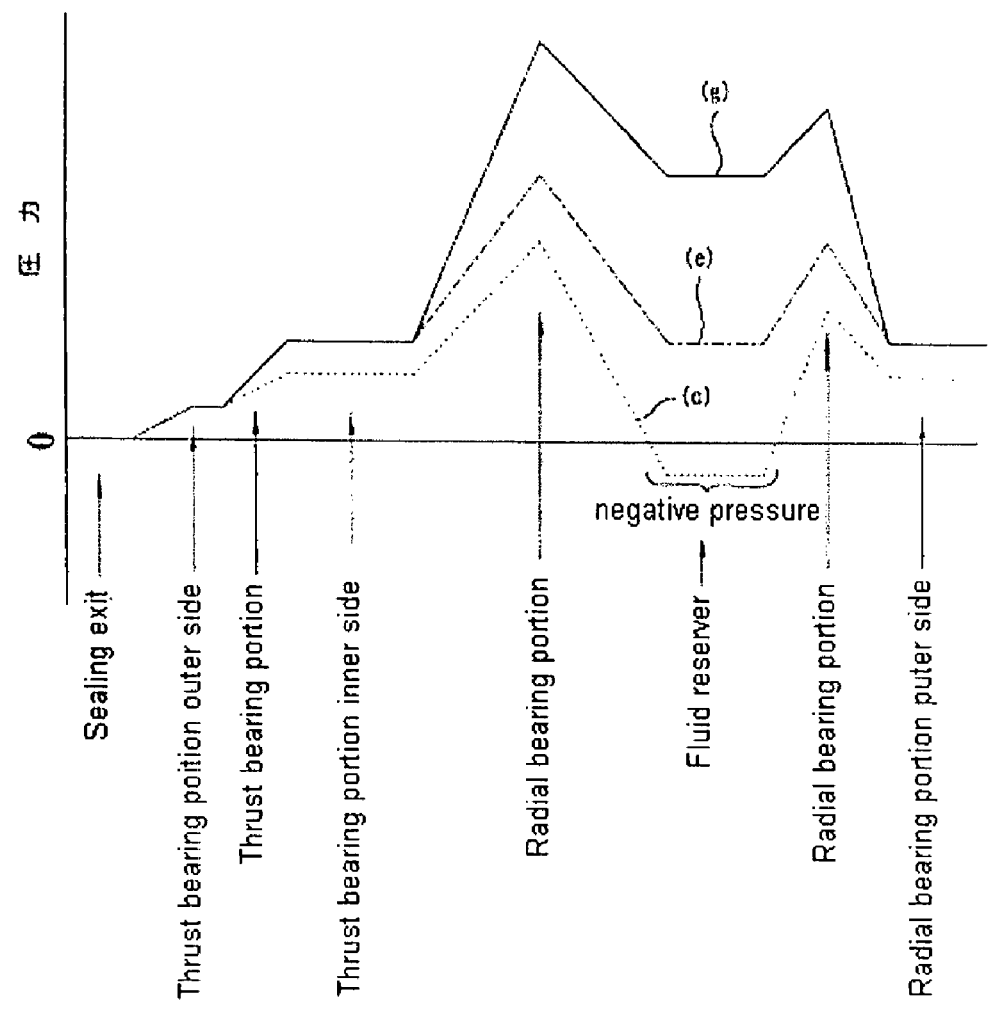
FIG. 20 is a linear diagram of the pressure distribution of the lubricant fluid in the bearing space.

Note that, as understood in FIG. 20, the pumping power to the lubricant fluid at the sealing exit of the thrust hydrodynamic bearing portion SB in addition to the two radial hydrodynamic bearing portions RB, RB is designed to give the lubricant fluid in the fluid reservoir OS a positive pressure, which is greater than the atmospheric pressure, obtaining more stable dynamic pressure.

Figure 21:
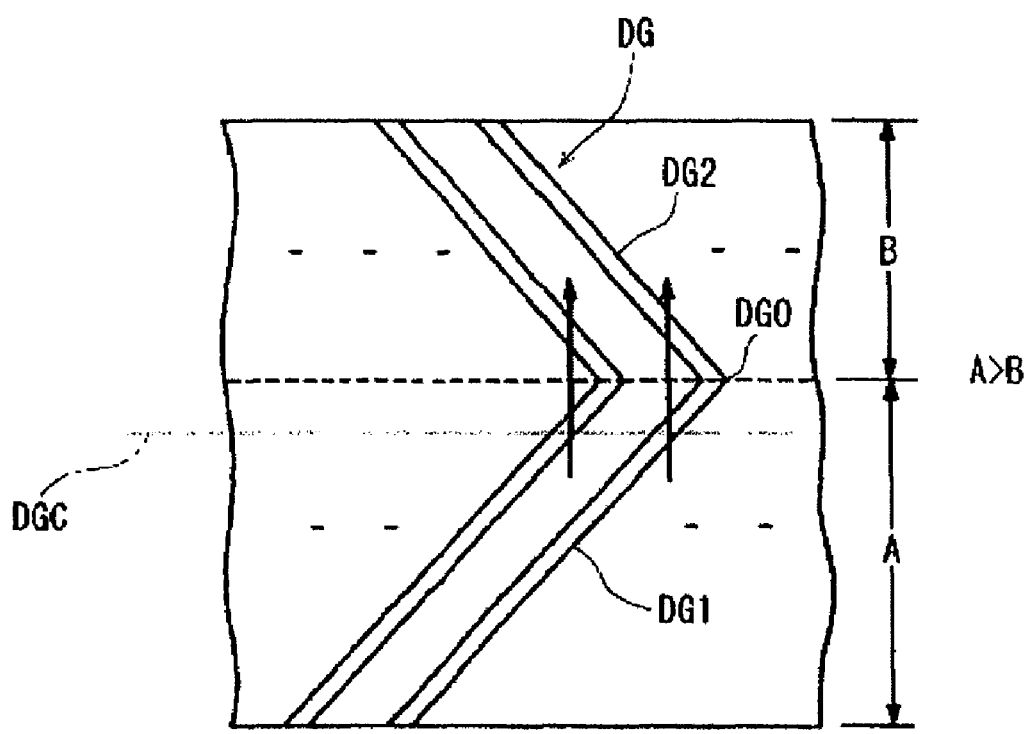
FIG. 21 is a diagram showing the structure of a dynamic pressure generating groove in another embodiment of the invention.

The dynamic pressure generating means of this embodiment is composed of an annular group of herringbone bent grooves DG which are substantially in the "<" shape as illustrated in FIG. 21. Even when the point DGO of the herringbone-shaped bent groove in the dynamic pressure generating means arranged at least one of the two radial hydrodynamic bearing portions RB, RB is displaced by a proper distance from the axial center position in the radial hydrodynamic bearing portion RB toward the fluid reservoir OS, the same function/effects as the above-mentioned embodiments can be obtained. In other words, in this embodiment, the axial length A of the groove portion DG1 of the herringbone-shaped bent groove on the axially outer side is designed to be longer than the axial length B of the groove portion DG2 on the axially inner side (A>B).

Figure 22:
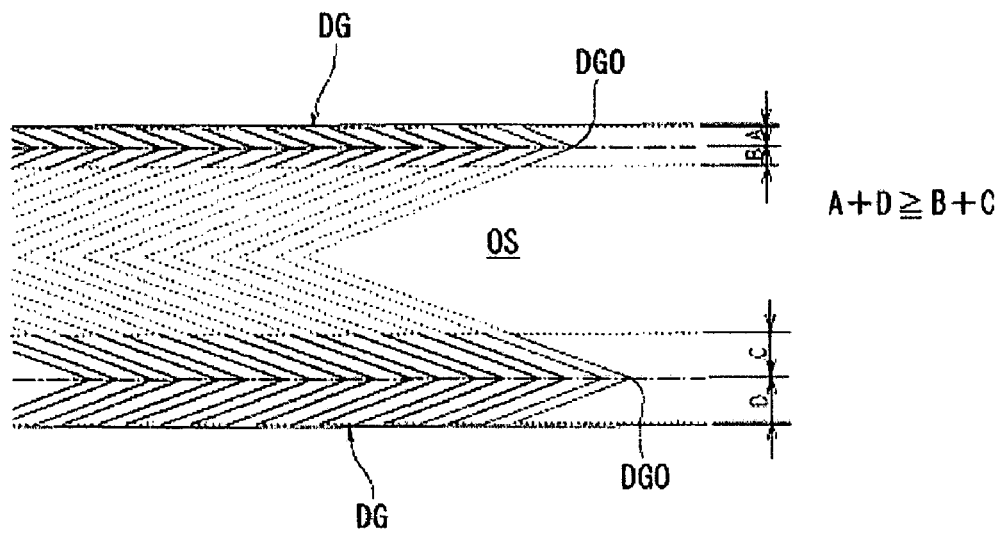
FIG. 22 is a diagram showing the structure of a dynamic pressure generating groove in further another embodiment of the invention.
Figure 23:
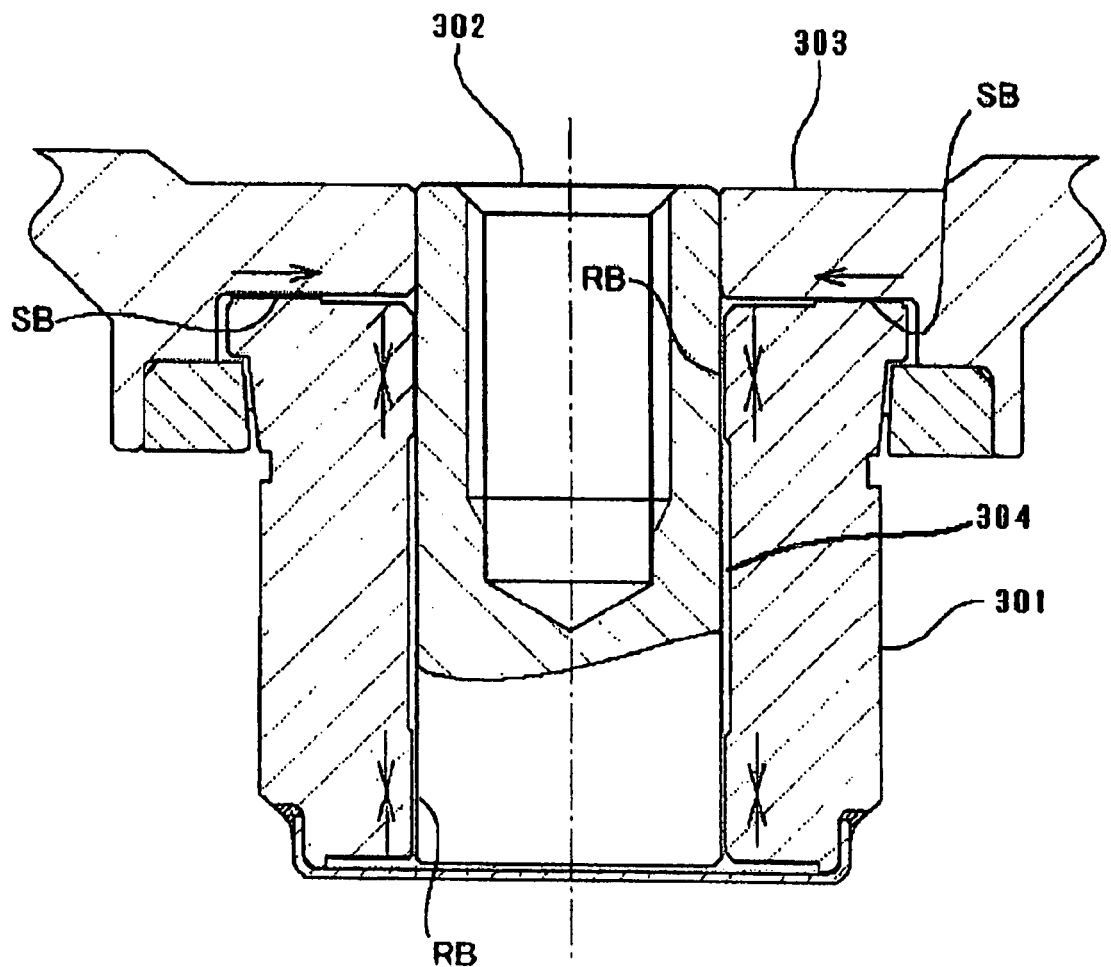
FIG. 23 is a vertical cross section of an example of a conventional hydrodynamic bearing device.

In the embodiment shown by FIG. 22, the groove lengths are set to satisfy the following formula:

$$A+D \geqq B+C$$

where A and D are respectively the axial lengths of the groove portions on the axially outer sides of the points DGO in the herringbone-shaped bent grooves DC, DG of the dynamic pressure generating means, which are respectively cut in the two radial hydrodynamic bearing portions RB, RB, and B and C are respectively the axial lengths of the groove portions on the axially inner sides of the points DGO.

According to the embodiment having such a configuration, the pumping power to the lubricant fluid in the two radial hydrodynamic bearing portions RB, RB is exerted to push the lubricant fluid toward the inside of the fluid reservoir OS as a whole. Therefore, the lubricant fluid inside of the fluid reservoir OS is constantly maintained at a positive pressure, which is greater than the atmospheric pressure.

Furthermore, the spindle motor in each embodiment is mounted inside the hard disk drive (HDD) as illustrated in FIG. 8, and the same function/effects can be obtained.

In other words, as illustrated in FIG. 8, a spindle motor M having a hydrodynamic bearing device of either one of the above-described embodiments is fixed to a main plate 100*a* that configures a sealed housing 100; the internal space of the housing 100 which now stores the spindle motor M is made to be a clean space 100*c* by covering it with a sealing lid 100*b* that fits to the main plate 100*a*. An information recording disk 101 such as a hard disk is mounted onto the rotary hub (see code 222 of FIG. 17) of the spindle motor M, and is held in place by a clamp 103 fixed to the rotary hub with a screw 102.

Although the invention devised by the present inventors has been described in detail based on the embodiments, it is not limited to these embodiments, but can be varyingly modified within the scope of the invention.

In each embodiment described above, the present invention is applied to a hard disk drive (HDD) spindle motor; however, it can be applied to various other hydrodynamic bearing devices in the same manner.

As described above, in the hydrodynamic bearing device of the present invention, a fluid pressurizing means is provided between the substantially conical inclined bearing space, which is created in the gap between the inclined dynamic pressure surfaces of the bearing sleeve and the shaft bush, and a fluid sealing portion, which prevents the lubricant fluid in the inclined bearing space from leaking to the outside, to pressurize the lubricant fluid in the direction to push it toward the inside of the inclined bearing space. Thus, the lubricant fluid pressurized by the fluid pressurizing means is pushed from the outer circumference of the inclined bearing space toward the inside to generate dynamic pressure excellently in the lubricant fluid in the inclined bearing space, despite the open angle of the inclined dynamic pressure surface. And also the lubricant fluid that is about to leak outside from the opening of the inclined bearing space on the outer circumferential side is kept inside the inclined bearing space in a stable manner by the rotational centrifugal force. Thus, an excellent amount of relative float can be obtained with certainty without enlarging the open angle of the inclined dynamic pressure surface, and the lubricant fluid is well prevented from leaking from the inclined bearing space to support the lubricant fluid retaining mechanism by the fluid sealing portion. Therefore, while the conical hydrodynamic bearing device can be manufactured small, the reliability can be improved.

In the hydrodynamic bearing device of the present invention is composed of multiple recessed grooves arranged annularly to make it possible to efficiently manufacture the fluid pressurizing means having a simple configuration and an excellent pressurizing function. In addition to the above-mentioned effects, the productivity can be improved.

In the hydrodynamic bearing device of the present invention is provided on at least one of the radially opposing wall surfaces of the bearing sleeve and shaft bush.

In the hydrodynamic bearing device of the present invention is provided on at least one of the axially opposing wall surfaces of the bearing sleeve and shaft bush. In those manners, the fluid pressurizing means with an excellent pressurizing function can be formed easily using the opposing wall surfaces of the bearing sleeve and shaft bush. Accordingly, the above-mentioned effects can be more improved and the productivity can be increased.

In the hydrodynamic bearing device of the present invention for guiding the lubricant fluid which has leaked to the outside of the inclined bearing space back to the inside of the inclined bearing space; therefore the lubricant fluid can flow smoothly through the circulating hole by the pressurizing action of the fluid pressurizing means.

In the recording disk drive of the present invention, the information is recorded or reproduced by the recording head with respect to the information recording disk mounted on the rotor of the spindle motor having the hydrodynamic bearing device disclosed in the present invention. Therefore, the above-mentioned effects can be obtained even in the disk recording device.

As described above, in the hydrodynamic bearing device of the present invention, a circulating hole is provided in at least either the shaft bush or the bearing sleeve which are rotatably coupled to each other, passing through the shaft bush or bearing sleeve, to create a circulation path of the lubricant fluid with the inclined bearing space; and at least one of the two openings of the circulating hole is formed at the perpendicular opening face of the shaft bush or bearing sleeve which is nearly perpendicular to the hole passing direction. With this configuration, the lubricant fluid is moved through the circulation path, including the circulating hole, to immediately cancel the unbalance of the pressure of the lubricant fluid, which is caused between the two ends of the inclined bearing space. Also, the circulating hole is formed by moving a tool from the perpendicular opening face which is nearly perpendicular to the hole passing direction to eliminate the displacement of the tool, to form the circulating hole with high precision, and to even the load stress applied to the tool to prolong the tool life. Thus, with a simple configuration, the differential pressure at both ends of the inclined bearing space can be maintained properly and the proper amount of relative float between the fixed member and the rotary member can be maintained easily and certainly. In addition, the productivity and reliability can be improved.

The recording disk drive of the present invention is configured such that the information is recorded or reproduced by a recording head with respect to the information recording disk mounted on the rotor of the spindle motor which has the hydrodynamic bearing device of the present invention. Therefore, the above-mentioned effects can be obtained even in the recording disk drive.

As described above, in the hydrodynamic bearing device of the present invention, pressure-adjusting bypasses are provided to balance the pressure in the bearing space. In addition, the lubricant fluid in the fluid reservoir provided between the two radial hydrodynamic bearing portions is pressurized to have a positive pressure, which is greater than the atmospheric pressure. Therefore, bubble formation in the lubricant fluid is well prevented and the proper dynamic pressure is obtained in a stable manner. Accordingly, with such a simple configuration, a stable dynamic pressure property can be obtained for a long duration and the reliability of the hydrodynamic bearing device can be improved.

The recording disk drive of the present invention is configured such that the information is recorded or reproduced by a recording head with respect to the information recording disk mounted on the rotor of the spindle motor which has the hydrodynamic bearing device of the present invention. Therefore, the above-mentioned effects can be obtained even in the recording disk drive.

While the foregoing description and drawings represent the present invention, it will be obvious to those skilled in the art that various changes may be made therein without departing from the true spirit and scope of the present invention.

What is claimed is:

1. A hydrodynamic bearing device comprising:
   a shaft bush having a substantially conical inclined dynamic pressure surface around the outer circumference thereof being relatively rotatably inserted in a bearing sleeve having a substantially conical inclined dynamic pressure surface around the inner circumference thereof,
   a substantially conical inclined bearing space being created in the gap between said inclined dynamic pressure surfaces of said bearing sleeve and shaft bush;
   lubricant fluid being filled inside said inclined bearing space;
   a dynamic pressure generating means being formed on at least one of said inclined dynamic pressure surfaces of said shaft bush and bearing sleeve;
   said lubricant fluid being pressurized by said dynamic pressure generating means to generate dynamic pressure, by which said shaft bush and said bearing sleeve are relatively elevated in the radial and thrust directions so that their rotations are supported in a non-contact manner;
   a circulating hole being provided in at least either said shaft bush or bearing sleeve, passing through said shaft bush or bearing sleeve in a straight line and having an opening at each end in a hole passing direction, to create a circulation path so that the lubricant fluid that has leaked from said inclined bearing space is moved through said circulating hole to cancel the differential pressure generated between the two ends of said inclined bearing space; and
   at least one of the two said openings of said circulating hole being formed with an opening face formed on said shaft bush or bearing sleeve, which extends nearly perpendicularly to the hole passing direction.

2. The hydrodynamic bearing device as set forth in claim 1, wherein said circulating hole is provided to a fixed member which is said shaft bush or bearing sleeve.

3. The hydrodynamic bearing device as set forth in claim 1, wherein said circulating hole is formed to extend nearly in parallel to said inclined dynamic pressure surface.

4. The hydrodynamic bearing device as set forth in claim 1, wherein said dynamic pressure generating means is composed of dynamic pressure generating recessed grooves at a plurality of locations which are spaced along said inclined dynamic pressure surface, and said circulation path including said circulating hole is created with respect to each of a plurality of said locations.

5. A recording disk drive comprising:
a spindle motor having the hydrodynamic bearing device as set forth in claim 1;
an information recording disk mounted on a rotor of said spindle motor; and
a recording head for recording or reproducing the information with respect to said information recording disk.

\* \* \* \* \*